United States Patent
Hindi et al.

(10) Patent No.: US 8,407,077 B2
(45) Date of Patent: Mar. 26, 2013

(54) SYSTEM AND METHOD FOR MANUFACTURING SYSTEM DESIGN AND SHOP SCHEDULING USING NETWORK FLOW MODELING

(75) Inventors: Haitham Ali Hindi, Menlo Park, CA (US); Wheeler Ruml, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1495 days.

(21) Appl. No.: 11/364,685

(22) Filed: Feb. 28, 2006

(65) Prior Publication Data

US 2007/0204226 A1 Aug. 30, 2007

(51) Int. Cl.
G06Q 10/00 (2006.01)
(52) U.S. Cl. .................. 705/7.27; 700/100; 705/7.26
(58) Field of Classification Search .............. 705/7.26, 705/7.27; 700/100
See application file for complete search history.

(56) References Cited

U.S. PATENT DOCUMENTS

| | | | |
|---|---|---|---|
| 4,579,446 A | 4/1986 | Fujino et al. | |
| 4,587,532 A | 5/1986 | Asano | |
| 4,744,027 A * | 5/1988 | Bayer et al. | 705/7.22 |
| 4,836,119 A | 6/1989 | Siraco et al. | |
| 5,004,222 A | 4/1991 | Dobashi | |
| 5,008,713 A | 4/1991 | Ozawa et al. | |
| 5,080,340 A | 1/1992 | Hacknauer et al. | |
| 5,095,342 A | 3/1992 | Farrell et al. | |
| 5,159,395 A | 10/1992 | Farrell et al. | |
| 5,208,640 A | 5/1993 | Horie et al. | |
| 5,229,948 A * | 7/1993 | Wei et al. | 700/99 |
| 5,272,511 A | 12/1993 | Conrad et al. | |
| 5,326,093 A | 7/1994 | Sollitt | |
| 5,435,544 A | 7/1995 | Mandel | |
| 5,473,419 A | 12/1995 | Russel et al. | |
| 5,489,969 A | 2/1996 | Soler et al. | |
| 5,504,568 A | 4/1996 | Saraswat et al. | |
| 5,525,031 A | 6/1996 | Fox | |
| 5,557,367 A | 9/1996 | Yang et al. | |
| 5,568,246 A | 10/1996 | Keller et al. | |
| 5,570,172 A | 10/1996 | Acquaviva | |
| 5,596,416 A | 1/1997 | Barry et al. | |
| 5,629,762 A | 5/1997 | Mahoney et al. | |

(Continued)

OTHER PUBLICATIONS

Ahuja et al., Solving the convex cost integer dual network flow problem. Management Science. Linthicum: Jul. 2003. vol. 49, Iss. 7; p. 950.*

(Continued)

Primary Examiner — Lynda Jasmin
Assistant Examiner — Timothy Padot
(74) Attorney, Agent, or Firm — Fay Sharpe LLP

(57) ABSTRACT

A method and tool is provided to obtain an optimistic estimate or exact optimal value of an operational parameter for a realistic system model under investigation. The model includes components and paths arranged to process continuous or discrete commodities. The system could be a model of a manufacturing system with different machines processing multiple job types, with different sequences of operations at different stages. Constraints are applied to the abstracted network flow model, and a plurality of steady state network flows are performed. and combined to captures the transformation of the commodities from a first state to a final output state. The optimistic estimate of the realistic system model under investigation is then returned through use of a general purpose or custom solver. The method can be used to perform tradeoff studies between machine allocations, job mixes, operating costs, reliability and throughput, or to speed up scheduling and machine control.

20 Claims, 19 Drawing Sheets

U.S. PATENT DOCUMENTS

| | | | |
|---|---|---|---|
| 5,710,968 A | 1/1998 | Clark et al. | |
| 5,778,377 A | 7/1998 | Marlin et al. | |
| 5,884,910 A | 3/1999 | Mandel | |
| 5,995,721 A | 11/1999 | Rourke et al. | |
| 6,044,222 A * | 3/2000 | Simons et al. | 717/156 |
| 6,059,284 A | 5/2000 | Wolf et al. | |
| 6,125,248 A | 9/2000 | Moser | |
| 6,241,242 B1 | 6/2001 | Munro | |
| 6,259,959 B1 * | 7/2001 | Martin | 700/99 |
| 6,278,901 B1 * | 8/2001 | Winner et al. | 700/99 |
| 6,279,009 B1 * | 8/2001 | Smirnov et al. | 1/1 |
| 6,297,886 B1 | 10/2001 | Cornell | |
| 6,341,773 B1 | 1/2002 | Aprato et al. | |
| 6,384,918 B1 | 5/2002 | Hubble, III et al. | |
| 6,450,711 B1 | 9/2002 | Conrow | |
| 6,476,376 B1 | 11/2002 | Biegelsen et al. | |
| 6,476,923 B1 | 11/2002 | Cornell | |
| 6,493,098 B1 | 12/2002 | Cornell | |
| 6,537,910 B1 | 3/2003 | Burke et al. | |
| 6,550,762 B2 | 4/2003 | Stoll | |
| 6,554,276 B2 | 4/2003 | Jackson et al. | |
| 6,577,925 B1 | 6/2003 | Fromherz | |
| 6,607,320 B2 | 8/2003 | Bobrow et al. | |
| 6,608,988 B2 | 8/2003 | Conrow | |
| 6,612,566 B2 | 9/2003 | Stoll | |
| 6,612,571 B2 | 9/2003 | Rider | |
| 6,621,576 B2 | 9/2003 | Tandon et al. | |
| 6,633,382 B2 | 10/2003 | Hubble, III et al. | |
| 6,639,669 B2 | 10/2003 | Hubble, III et al. | |
| 6,819,906 B1 | 11/2004 | Herrmann et al. | |
| 6,898,475 B1 | 5/2005 | Ruml et al. | |
| 6,925,283 B1 | 8/2005 | Mandel et al. | |
| 6,959,165 B2 | 10/2005 | Mandel et al. | |
| 6,973,286 B2 | 12/2005 | Mandel et al. | |
| 2002/0032804 A1 * | 3/2002 | Hunt | 709/320 |
| 2002/0078012 A1 | 6/2002 | Ryan et al. | |
| 2002/0103559 A1 | 8/2002 | Gartstein | |
| 2003/0077095 A1 | 4/2003 | Conrow | |
| 2004/0085561 A1 | 5/2004 | Fromherz | |
| 2004/0085562 A1 | 5/2004 | Fromherz | |
| 2004/0088207 A1 | 5/2004 | Fromherz | |
| 2004/0150156 A1 | 8/2004 | Fromherz et al. | |
| 2004/0150158 A1 | 8/2004 | Biegelsen et al. | |
| 2004/0153983 A1 | 8/2004 | McMillan | |
| 2004/0186804 A1 * | 9/2004 | Chakraborty et al. | 705/36 |
| 2004/0216002 A1 | 10/2004 | Fromherz et al. | |
| 2004/0225391 A1 | 11/2004 | Fromherz et al. | |
| 2004/0225394 A1 | 11/2004 | Fromherz et al. | |
| 2004/0247365 A1 | 12/2004 | Lofthus et al. | |
| 2005/0102044 A1 * | 5/2005 | Kohn et al. | 700/28 |
| 2005/0192783 A1 * | 9/2005 | Lystad et al. | 703/3 |
| 2005/0210455 A1 * | 9/2005 | Koehler et al. | 717/136 |
| 2005/0278050 A1 | 12/2005 | Ruml et al. | |
| 2007/0055392 A1 * | 3/2007 | D'Amato et al. | 700/44 |

OTHER PUBLICATIONS

Smith, M. (2003). Making customers' work flow better. Printing Impressions, 46(3), 36-38.*

Morgan, P.F., "Integration of Black Only and Color Printers", Xerox Disclosure Journal, vol. 16, No. 6, Nov./Dec. 1991, pp. 381-83.

Desmond Fretz, "Cluster Printing Solution Announced", Today at Xerox (TAX), No. 1129, Aug. 3, 2001.

Wang, et al., "Applying the Networking Flow Model to Evaluate an FMC's Throughput"; Int. J. Prod. Res., 2002, vol. 40, No. 3, pp. 525-536.

U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/917,768, filed Aug. 13, 2004, Lofthus et al.
U.S. Appl. No. 10/924,106, filed Aug. 23, 2004, Lofthus et al.
U.S. Appl. No. 10/924,113, filed Aug. 23, 2004, deJong et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,326, filed Nov. 30, 2004, Grace et al.
U.S. Appl. No. 10/999,450, filed Nov. 30, 2004, Lofthus et al.
U.S. Appl. No. 11/000,158, filed Nov. 30, 2004, Roof.
U.S. Appl. No. 11/000,168, filed Nov. 30, 2004, Biegelsen et al.
U.S. Appl. No. 11/000,258, filed Nov. 30, 2004, Roof.
U.S. Appl. No. 11/051,817, filed Feb. 4, 2005, Moore et al.
U.S. Appl. No. 11/070,681, filed Mar. 2, 2005, Viturro et al.
U.S. Appl. No. 11/081,473, filed Mar. 16, 2005, Moore.
U.S. Appl. No. 11/069,020, filed Feb. 28, 2005, Lofthus et al.
U.S. Appl. No. 11/089,854, filed Mar. 25, 2005, Clark et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore et al.
U.S. Appl. No. 11/094,998, filed Mar. 31, 2005, Moore et al.
U.S. Appl. No. 11/094,864, filed Mar. 31, 2005, de Jong et al.
U.S. Appl. No. 11/095,872, filed Mar. 31, 2005, Julien et al.
U.S. Appl. No. 11/102,355, filed Apr. 8, 2005, Fromherz et al.
U.S. Appl. No. 11/084,280, filed Mar. 18, 2005, Mizes.
U.S. Appl. No. 11/109,566, filed Apr. 19, 2005, Mandel et al.
U.S. Appl. No. 11/109,558, filed Apr. 19, 2005, Furst et al.
U.S. Appl. No. 11/109,996, filed Apr. 20, 2005, Mongeon et al.
U.S. Appl. No. 11/093,229, filed Mar. 29, 2005, Julien.
U.S. Appl. No. 11/102,899, filed Apr. 8, 2005, Crawford et al.
U.S. Appl. No. 11/102,910, filed Apr. 8, 2005, Crawford et al.
U.S. Appl. No. 11/115,766, filed Apr. 27, 2005, Grace.
U.S. Appl. No. 11/102,332, filed Apr. 8, 2005, Hindi et al.
U.S. Appl. No. 11/136,959, filed May 25, 2005, German et al.
U.S. Appl. No. 11/122,420, filed May 5, 2005, Richards.
U.S. Appl. No. 11/137,634, filed May 25, 2005, Lofthus et al.
U.S. Appl. No. 11/137,251, filed May 25, 2005, Lofthus et al.
U.S. Appl. No. 11/137,273, filed May 25, 2005, Anderson et al.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598, filed Jun. 21, 2005, Frankel.
U.S. Appl. No. 11/143,818, filed Jun. 2, 2005, Dalal et al.
U.S. Appl. No. 11/146,665, filed Jun. 7, 2005, Mongeon.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/170,873, filed Jun. 30, 2005, Klassen.
U.S. Appl. No. 11/170,975, filed Jun. 30, 2005, Klassen.
U.S. Appl. No. 11/170,845, filed Jun. 30, 2005, Sampath et al.
U.S. Appl. No. 11/189,371, filed Jul. 26, 2005, Moore et al.
U.S. Appl. No. 11/212,367, filed Aug. 26, 2005, Anderson et al.
U.S. Appl. No. 11/208,871, filed Aug. 22, 2005, Dalal et al.
U.S. Appl. No. 11/215,791, filed Aug. 30, 2005, Hamby et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/222,260, filed Sep. 8, 2005, Goodman et al.
U.S. Appl. No. 11/235,979, filed Sep. 27, 2005, Anderson et al.
U.S. Appl. No. 11/247,778, filed Oct. 11, 2005, Radulski et al.
U.S. Appl. No. 11/248,044, filed Oct. 12, 2005, Spencer et al.
U.S. Appl. No. 11/236,099, filed Sep. 27, 2005, Anderson et al.
U.S. Appl. No. 11/287,177, filed Nov. 23, 2005, Mandel et al.
U.S. Appl. No. 11/291,583, filed Nov. 30, 2005, Lang.
U.S. Appl. No. 11/291,860, filed Nov. 30, 2005, Willis.
U.S. Appl. No. 11/274,638, filed Nov. 15, 2005, Wu et al.
U.S. Appl. No. 11/287,685, filed Nov. 28, 2005, Carolan.
U.S. Appl. No. 11/317,589, filed Dec. 23, 2005, Biegelsen et al.
U.S. Appl. No. 11/314,774, filed Dec. 21, 2005, Klassen.
U.S. Appl. No. 11/317,167, filed Dec. 23, 2005, Lofthus et al.
U.S. Appl. No. 11/314,828, filed Dec. 21, 2005, Anderson et al.
U.S. Appl. No. 11/292,388, filed Nov. 30, 2005, Mueller.
U.S. Appl. No. 11/292,163, filed Nov. 30, 2005, Mandel et al.
U.S. Appl. No. 11/312,081, filed Dec. 20, 2005, Mandel et al.
U.S. Appl. No. 11/331,627, filed Jan. 13, 2006, Moore.
U.S. Appl. No. 11/341,733, filed Jan. 27, 2006, German.
U.S. Appl. No. 11/102,332, filed Apr. 8, 2005, Hindi.
U.S. Appl. No. 11/359,065, filed Feb. 22, 2005, Banton.
U.S. Appl. No. 11/349,828, filed Feb. 8, 2006, Banton.
U.S. Appl. No. 11/364,685, filed Feb. 28, 2006, Hindi et al.

U.S. Appl. No. 11/363,378, filed Feb. 27, 2006, Anderson et al.
U.S. Appl. No. 11/378,046, filed Mar. 17, 2006, Rizzolo et al.
U.S. Appl. No. 11/378,040, filed Mar. 17, 2006, German.
U.S. Appl. No. 11/403,785, filed Apr. 13, 2006, Banton et al.
U.S. Appl. No. 11/399,100, filed Apr. 6, 2006, Paul.
U.S. Appl. No. 11/417,411, filed May 4, 2006, DeGruchy.
U.S. Appl. No. 11/432,924, filed May 12, 2006, Lieberman et al.
U.S. Appl. No. 11/432,905, filed May 12, 2006, Mongeon et al.
Bertsimas, et al., "From Fluid Relaxations to Practical Algorithms for Job Shop Scheduling: the Holding Cost Objective," *Operations Research*, 2003, vol. 51, No. 5, pp. 798-813.
Bertsimas, et al., "From Fluid Relaxations to Practical Algorithms for Job Shop Scheduling: the Holding Cost Objective," revised Jun. 2002, pp. 1-37.
Bertsimas, et al., "Asymptotically Optimal Algorithms for Job Shop Scheduling and Packet Routing," revised Jun. 1999, pp. 1-23.
U.S. Appl. No. 11/432,993, filed May 12, 2006, Anderson.
Bertsimas, et al., "Asymptotically Optimal Algorithms for Job Shop Scheduling and Packet Routing," *Journal of Algorithms*, Jun. 1999, vol. 33(2), pp. 296-318.

* cited by examiner

SYSTEM AND METHOD FOR MANUFACTURING SYSTEM DESIGN AND SHOP SCHEDULING USING NETWORK FLOW MODELING

BACKGROUND

This application is directed to a system and method for use in a manufacturing or production planning environment, and more particularly to generating and using a tool which employs network flow modeling to either determine an exact optimal value or optimistic estimate of an operational parameter for the manufacturing or production planning environment.

Existing methods for analyzing manufacturing systems can require invoking an expensive combinatorial planner/scheduler multiple times in order to estimate throughput under many different conditions.

A typical manufacturing environment may be represented as a network of transports linking multiple components, as shown in FIG. 1. A manufacturing environment may have anywhere from a few to a several hundred components (e.g. machines) and paths (e.g., transports). Unfinished commodities or material may enter the environment from multiple sources and completed jobs can exit at multiple destinations. In the simplified schematic of FIG. 1, Sources 1 and 2 provide materials to Machine 1 and Machine 2, which interface with Machine 3 and Machine 4 as well as Destinations 1 and 2. The to-be-disclosed system is also able to handle the scenario of producing multiple products, each with its own sequence of operations.

From a planning perspective, jobs can move through the environment as illustrated in FIG. 2. A job request specifies a desired final configuration, which may be achievable by several different sequences of actions One area which addresses scheduling/planning is stochastic processing networks. In this area, the question being asked is, if you have a buffer on the input to each machine, by what manner is material to be routed through the system to minimize the length of the backlog in the buffers, and how can the throughput of the network be maximized. Stochastic methods use optimization techniques such as, Markov decision processes, approximate dynamic programming, Brownian motion approximations, etc. to compute routing policies. An issue with the stochastic approach is that it makes the assumption that it is not possible to accurately time how long a certain process will take. In view of its presumptions, stochastic techniques will include modeling the processing times of components as Markov random variables. In other words, it will be assumed that each time a component is processed by a machine, it will take a slightly different amount of time, that follows some probability distribution. However in real manufacturing systems, processing time estimates can be highly accurate, and are not necessarily random variables.

The assumptions of the stochastic based methods add much complexity to the stochastic-type planners. One of the more difficult issues in stochastic analysis is that when a stochastic scheduling/planning system is implemented, transients (start-up transients and ramp-down transients) exist, and a great deal of effort and processing is needed to quantify the transients. These transients exist due to the non steady-state environment in which the planners function.

Another area of planning is related to flow-based models for manufacturing systems, as discussed in the article, "Applying the Network Flow Model to Evaluate an FMC's Throughput", Wang et al., Int. J. Prod. Res., 2002, Vol. 40, No. 3, 525-536. The described system employs nodes and links to create a multi-commodity network flow, which uses fixed routes. The system discussed in this paper does not address a situation where components of the system are actually physically distributed, or where there is a need to handle re-entrant lines (i.e. a cycle flow through the system). In fact, the paper states that, "[o]wing to the inherent limitations of a maximum flow network, a cycle should not be formed in the network. So care must be taken that multiple alternative routing will not result in a cycle while using this model." Therefore the paper explicitly rules out cycles, and re-entrant flows.

Yet another line of research on deterministic methods for scheduling has been reported by Bertsimas, Gamarnik, and Sethurman in the article, From Fluid Relaxations to Practical Algorithms for Job Shop Scheduling: The Holding Cost Objective, Operations Research, 51, 2003, and the references therein. This work addresses make-span type objectives (holding cost, etc.) but does not produce a steady state analysis. It also does not address the case with arbitrary routing, where there are multiple machines of the same type. An earlier work by the same authors, cited in the above article, addresses routing, but only in a very restricted packet-routing setting, where each packet has a single source and single destination, and does not allow for a sequence of machine types (destinations), each of which has several possible locations in the network.

The above-described planning techniques, and other existing techniques each have various drawbacks. For example, bound/branch (state-space) searching is often used to solve planning/scheduling problems. However, such problems solved by such techniques are known to grow exponentially as the problems become more complex, resulting in the searches used to solve these problems, themselves becoming very complex, requiring large amounts of processing power and time to complete the searches. Additionally, existing planner/schedulers are normally optimized in a job-at-a-time process. This has certain drawbacks, and in fact may not be implementable if one is attempting to investigate optimal steady state performance. In view of these drawbacks, it is considered that improvements in developing a tool which can quickly obtain either an exact or optimistic estimate of the system's optimal behavior has benefits not obtained by the existing systems

CROSS REFERENCE TO RELATED PATENTS AND APPLICATIONS

The following applications, the disclosures of each being totally incorporated herein by reference are mentioned:

U.S. application Ser. No. 10/924,458, filed Aug. 23, 2004, entitled "PRINT SEQUENCE SCHEDULING FOR RELIABILITY," by Robert M. Lofthus, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. application Ser. No. 11/069,020, filed Feb. 28, 2004, entitled "PRINTING SYSTEMS," by Robert M. Lofthus, et al.;

U.S. application Ser. No. 11/102,899, filed Apr. 8, 2005, entitled "SYNCHRONIZATION IN A DISTRIBUTED SYSTEM," by Lara S. Crawford, et al.;

U.S. application Ser. No. 11/102,910, filed Apr. 8, 2005, entitled "COORDINATION IN A DISTRIBUTED SYSTEM," by Lara S. Crawford, et al.;

U.S. application Ser. No. 11/102,355, filed Apr. 8, 2005, entitled "COMMUNICATION IN A DISTRIBUTED SYSTEM," by Markus P. J. Fromherz, et al.;

U.S. application Ser. No. 11/102,332, filed Apr. 8, 2005, entitled "ON-THE-FLY STATE SYNCHRONIZATION IN A DISTRIBUTED SYSTEM," by Haitham A. Hindi;

U.S. application Ser. No. 11/122,420, filed May 5, 2005, entitled "PRINTING SYSTEM AND SCHEDULING METHOD," by Austin L. Richards;

U.S. application Ser. No. 11/136,959, filed May 25, 2005, entitled "PRINTING SYSTEMS," by Kristine A. German, et al.;

U.S. application Ser. No. 11/137,634, filed May 25, 2005, entitled "PRINTING SYSTEM," by Robert M. Lofthus, et al.;

U.S. application Ser. No. 11/137,251, filed May 25, 2005, entitled "SCHEDULING SYSTEM," by Robert M. Lofthus, et al.;

U.S. application Ser. No. 11/152,275, filed Jun. 14, 2005, entitled "WARM-UP OF MULTIPLE INTEGRATED MARKING ENGINES," by Bryan J. Roof, et al.;

U.S. application Ser. No. 11/156,778, filed Jun. 20, 2005, entitled "PRINTING PLATFORM," by Joseph A. Swift;

U.S. application Ser. No. 11/157,598, filed Jun. 21, 2005, entitled "METHOD OF ORDERING JOB QUEUE OF MARKING SYSTEMS," by Neil A. Frankel;

U.S. application Ser. No. 11/170,845, filed Jun. 30, 2005, entitled "HIGH AVAILABILITY PRINTING SYSTEMS," by Meera Sampath, et al.;

U.S. application Ser. No. 10/855,938, filed May 27, 2004 (now Publication No. 2005/0278050 A1, published Dec. 15, 2005), entitled "EXCEPTION HANDLING IN MANUFACTURING SYSTEMS COMBINING ON-LINE PLANNING AND PREDETERMINED RULES," by Ruml, et al.

U.S. application Ser. No. 10/855,937; filed May 27, 2004 (now U.S. Pat. No. 6,898,475 B1; issued May 24, 2005), entitled "SYSTEM AND METHOD UTILIZING TEMPORAL CONSTRAINTS TO COORDINATE MULTIPLE PLANNING SESSIONS," by Ruml, et al.

INCORPORATION BY REFERENCE

U.S. application Ser. No. 10/855,938, filed May 27, 2004 (now Publication No. 2005/0278050 A1, published Dec. 15, 2005), entitled "EXCEPTION HANDLING IN MANUFACTURING SYSTEMS COMBINING ON-LINE PLANNING AND PREDETERMINED RULES," by Ruml, et al.; and U.S. application Ser. No. 10/855,937; filed May 27, 2004 (now U.S. Pat. No. 6,898,475 B1; issued May 24, 2005), entitled "SYSTEM AND METHOD UTILIZING TEMPORAL CONSTRAINTS TO COORDINATE MULTIPLE PLANNING SESSIONS," by Ruml, et al., are each being fully incorporated herein by reference.

BRIEF DESCRIPTION

A method system and tool is provided to compute an exact optimal value or an optimistic estimate of an operational parameter for a realistic system model under investigation. The realistic system model includes components and paths arranged to process commodities possibly representing discrete jobs or work units. An abstracted network flow model of the realistic system model under investigation is generated. Constraints are applied to the abstracted network flow model, and a plurality of steady state network flows, which take into consideration the applied constraints, are formed. The network flows are combined or cascaded into an aggregate network flow, which captures a transformation of the commodities from a first state to a final output state. The flow network, represented as an optimization problem, is then solved by a general-purpose or custom solver. The optimized optimistic operational parameter estimate of the realistic system model under investigation is then returned.

DETAILED DESCRIPTION

Figure 1:
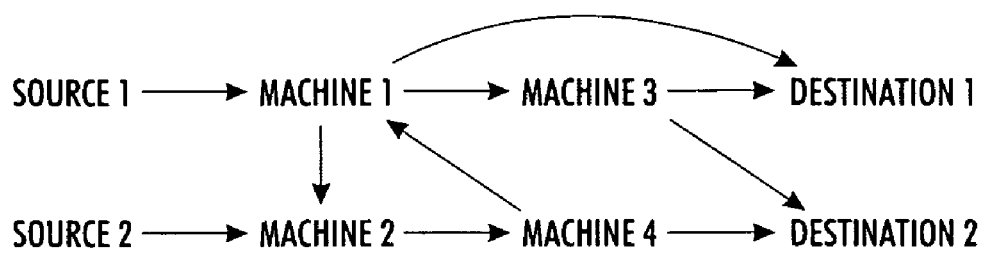
FIG. 1 is a schematic diagram of an example manufacturing plant.
Figure 2:
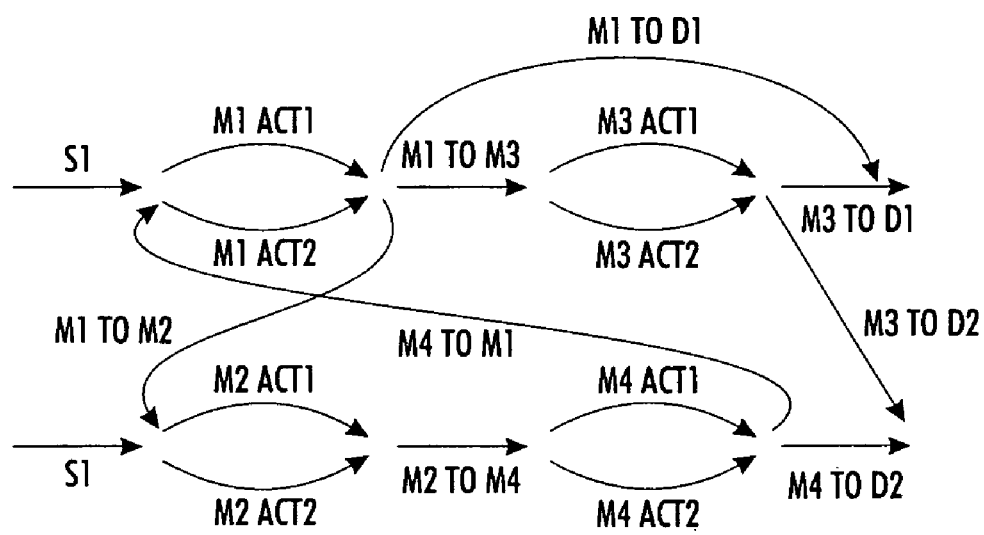
FIG. 2 is a schematic diagram of possible job flow within the manufacturing plant of FIG. 1.

The present application is directed to a network flow tool and method which quickly computes an exact value or an optimistic estimate of an operational parameter, such as but not limited to, throughput or reliability in a manufacturing environment, including a printing system or any other environment which processes continuous or discrete commodities or materials. If the materials are truly continuous, then the method will compute the true exact optimal value of the operational parameter; if the material is discrete, then the method may compute at best the true exact optimal value or at the very least an optimistic estimate of the true exact optimum value. The network flow tool investigates the manufacturing environment as a steady-state problem. It also permits a user to obtain a quick understanding of the effect of component failures on performance, allows faster exploration and broader coverage of the space of possible designs, and enables exploration of trade-offs among different aspects of the system, such as robustness, component usage, and reliability. Additionally, since the network flow tool employs a flow relaxation methodology, the bounds computed by the tool are either exact or optimistic, and can be used as a heuristic evaluation function in a job-level system or shop-level scheduler.

In the present discussion, "exact optimal value" and "optimistic estimate" are used to describe that the present system and method finds estimates that might find a true optimum value of a particular operational parameter, but are guaranteed to produce at least an optimistic estimate, if the system and method fails to find the true optimal value. It is to be appreciated a network flow tool configured in accordance with the present concepts is able to obtain either one of the exact optimal value or optimistic estimate, dependent upon the particular network and operational parameters being investigated.

In the present design, the discrete nature of materials or commodities (for example, in a printing system, the material or commodity may be discrete sheets) processed by a manufacturing system is relaxed in order to permit a continuous flow investigation. With regard to the example of a printing system, it is assumed here that the sheets (assuming duplex printing) follow the following flow, Fed→Printed→Inverted→Printed→Inverted→Output. It is to be appreciated other flows are possible, and the described five-stage flow is only presented as an illustration. Each of the five flows (e.g. Fed→Printed being the first flow; Printed→Inverted being the second, and so on) are modeled as one commodity in a multi-commodity network flow maximization problem.

Furthermore, it is possible to simultaneously model with this system and method the case where several job types exist, each with its own sequence of operations. For example the system could be doing both simplex (Fed→Printe→Output) duplex printing (Fed→Printed→Inverted→Printed→Inverted→Output) simultaneously. In this case, two additional flows would be generated (F→P and P→O) and would interact with each other and the duplex flows only via the capacity constraints on the resources (e.g., printer capacity, highway capacity, etc.).

As will be explained in greater detail below, for more complex systems which have multiple components of the same type (such as multiple feeders, multiple printers, multiple inverters, etc.) artificial nodes may be provided. Constraints are also added to the network flow model. One such constraint is to insure the flow into a component (a print engine, for example) equals the flow of the transformed commodity out of the component. Convex optimization can be used to solve the problem of maximizing the flow. An article by Xiao, Johansson and Boyd, entitled, Simultaneous Routing and Resource Allocation Via Dual Decomposition, IEEE Trans. on Comm., 52(7): 1136-1144, July 2004, as well as books and papers by others have discussed basic multicommodity network flow analysis techniques, and should be helpful from a notational and computational point of view. This article and the others, however, are not considered as discussing other concepts set forth herein such as, but not limited to, re-entrant lines.

Figure 3:
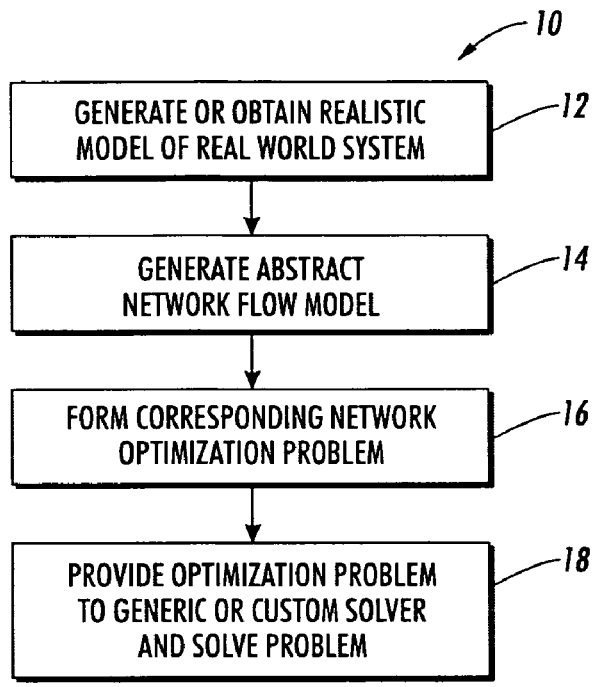
FIG. 3 illustrates a high-level flow chart representing implementation of the present concepts.

Turning to FIG. 3, illustrated is a high-level flowchart 10 representing implementation of the present concepts. In step 12, a realistic model of the physical manufacturing environment or system is generated or otherwise provided. In step 14, an abstract network flow model of the realistic model, including among other features, nodes, links, artificial nodes, constraints and copies of flow paths, is generated. Thereafter, in step 16 a corresponding network optimization problem is generated, and in step 18, the problem is passed to a generic or custom solver, and is solved.

Figure 4:
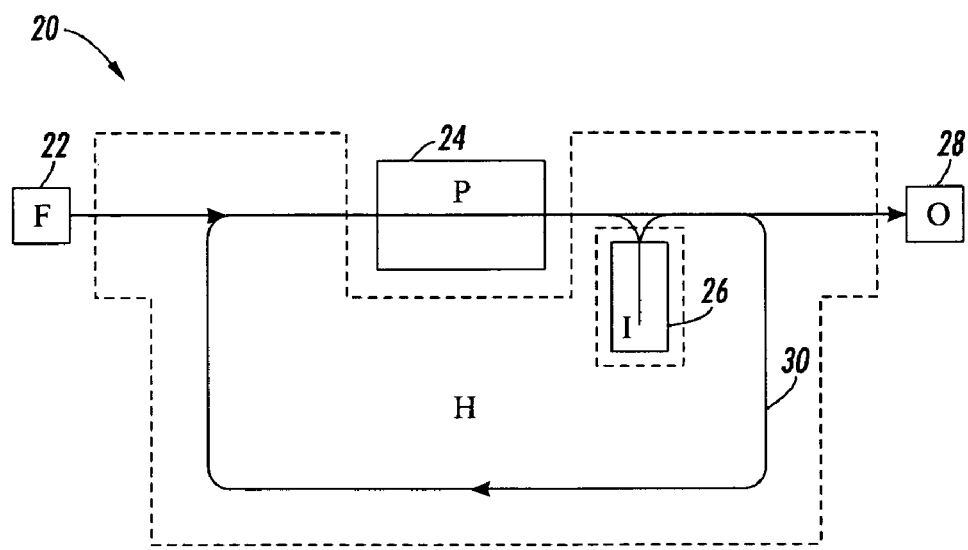
FIG. 4 depicts a simplified realistic model of a duplex printer.
Figure 5:
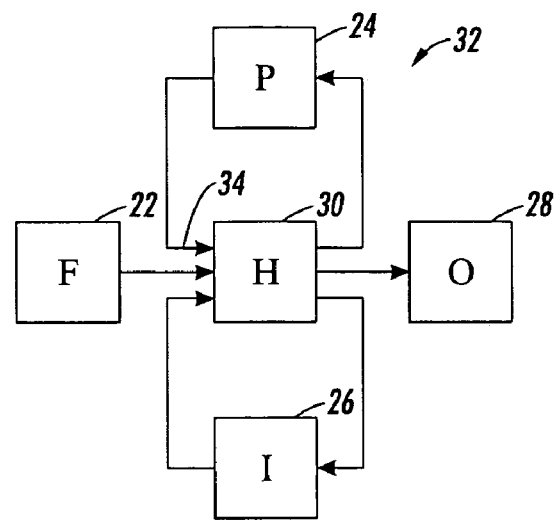
FIG. 5 illustrates an aggregated abstract network flow model of the realistic model of FIG. 4.

FIGS. 4-10 are provided to assist in illustrating a discussion regarding steps 12 and 14 of flowchart 10. More particularly, FIG. 4 depicts a simplified realistic model of a duplex printer 20, including a feeder 22, print engine 24, inverter 26, output 28 and highway 30. It is to be appreciated that in a more detailed/realistic model, highway 30 will be modeled in more detail to capture connections and constraints of the individual components. FIG. 5 shows an aggregated abstract network flow model 32 of realistic model 20 as described in step 14 of FIG. 3. Particularly, the flows of FIGS. 6-10 are cascaded together to form the aggregated model 32 of FIG. 5. Cascading acknowledges the inter-relationship between the flows of FIGS. 6-10 and the constraints of the system being applied to each individual flow. Thus, the concept of cascading includes the idea that the optimization software needs to take into account each of the individual flows when optimizing a single particular flow. For example, the flow of FIG. 6 cannot be optimized in a fashion that would result in an unacceptable diminishing of the flow in FIG. 7.

Figure 6:
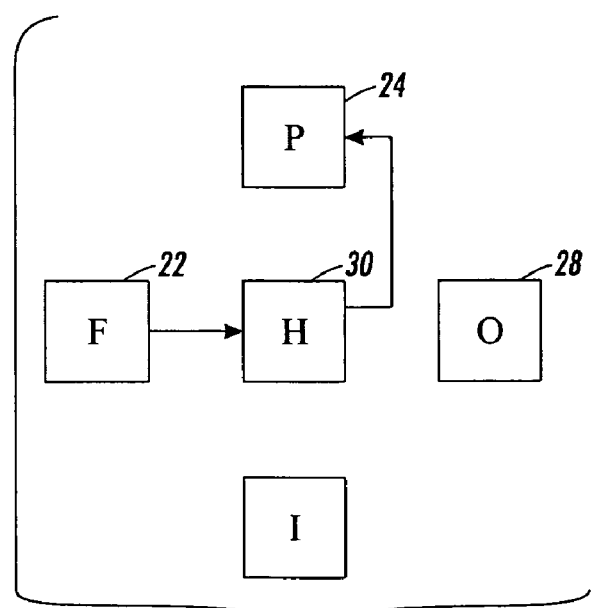
FIGS. 6-10 set forth five transformations of a commodity which are part of the aggregated flow diagram of FIG. 5.
Figure 7:
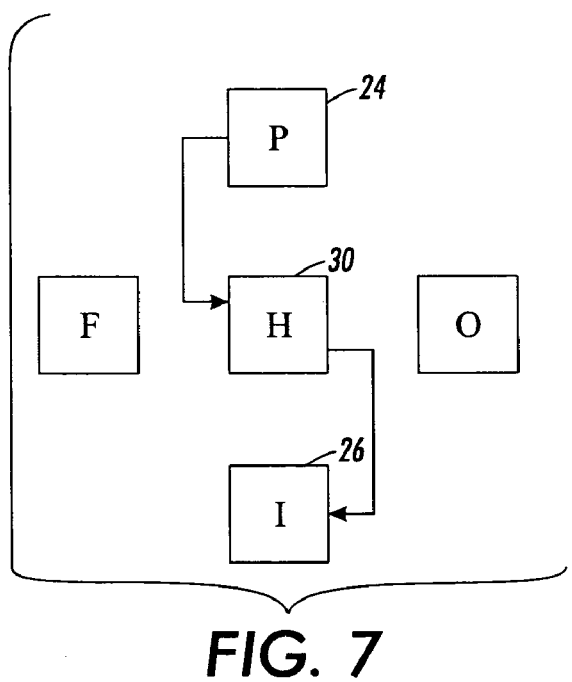
Figure 8:
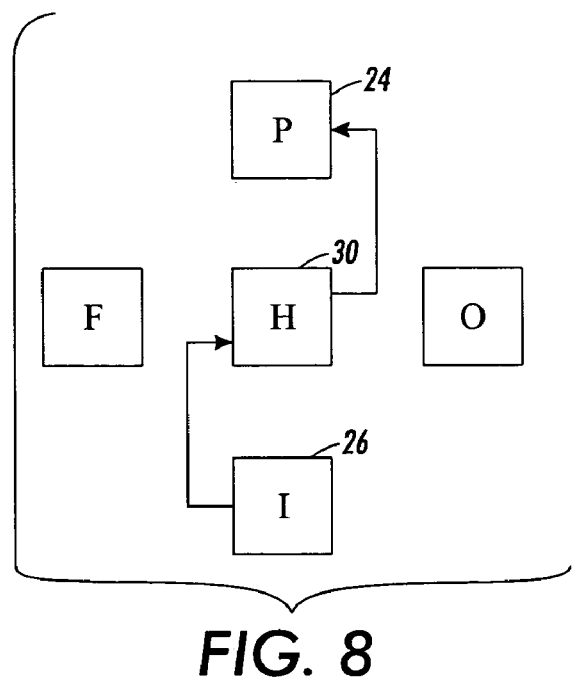

In FIG. 6, the sheet is fed from feeder 22 to highway 30, which moves the sheet to print engine 24, where the sheet is printed on a first side. As shown in FIG. 7, the printed sheet at print engine 24 is moved to inverter 26 on highway 30, where the sheet is inverted to its non-printed side. Thus, the flow of FIG. 7 represents the commodity "sheets printed on one side but not yet inverted", whereas the flow in FIG. 6 represents "sheets not yet printed on either side." Then in FIG. 8, the sheet is moved from inverter 26 to highway 30, and back to print engine 24, where it is printed on the previously unprinted side. Next, in FIG. 9, the sheet moves from print engine 24 to inverter 26 via highway 30, in order to be returned to its original side (obviously, this step is optional, as the printed sheet may simply be output un-reinverted). Lastly, in FIG. 10 the sheet moves from inverter 26 back through highway 30 to output 28.

To generate the abstract network model flow of FIG. 5, each of the process flows of FIGS. 6-10 are combined or "laid on top of each other." This cascading procedure takes into account situations where there are multiple entries into a component. For instance, in FIGS. 6-10 there are three occasions where the sheet enters (or re-enters) highway 30. Therefore, in FIG. 5 three arrows 34, pointing into the highway, represent such entry and re-entry (i.e., a re-entrant situation).

FIGS. 4-10 have illustrated a simple example of how an abstract network model flow is developed from a realistic model. Such operation is fairly natural and intuitive. However, implementation of network model flow may be extended to more complex systems, such as, but not limited to, printing systems having multiple print engines, inverters, feeders, etc. One such complex system is a TIPP printing system of Xerox Corporation, as described in the patents cited in the present application.

To address these more complex systems (such as those having multiple similar components, i.e., printers, feeders, inverters, etc.), the present concepts employ the use of "virtual or artificial nodes." Expanding on this concept, attention is directed to FIGS. 11-15, which set forth five flows similar to those of FIGS. 6-10 (again, for simplex jobs those would be Fed→Printed, Printed→Inverted, Inverted→Printed, Printed→Inverted, Inverted→Output), but for a system having multiple components of the same type.

Figure 9:
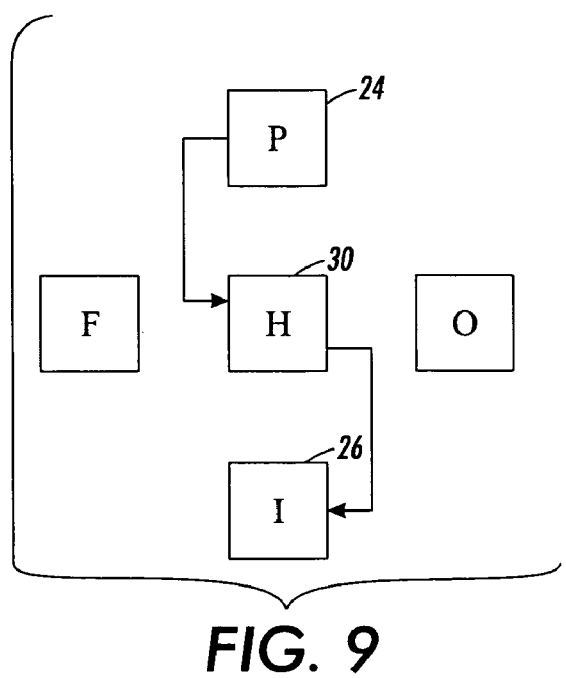
Figure 10:
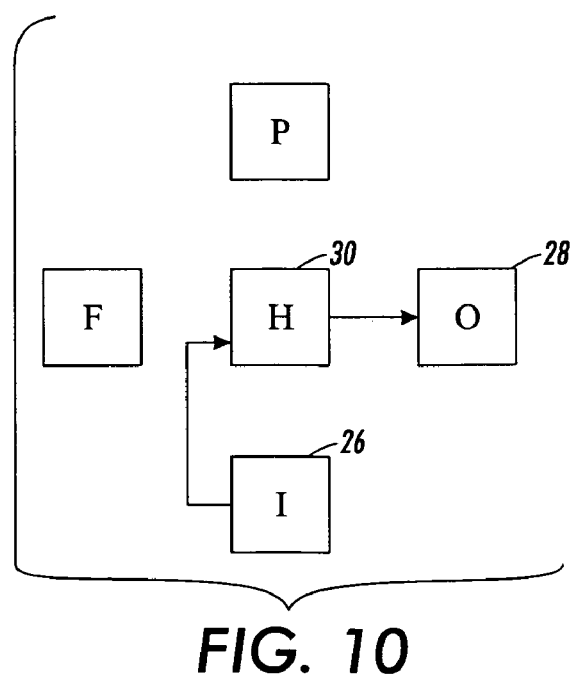
Figure 11:
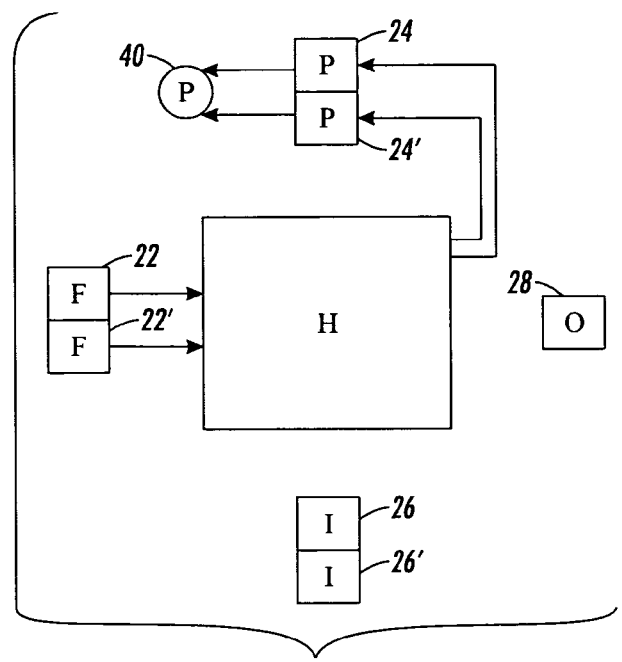
FIGS. 11-15 set forth five flows, similar to those of FIGS. 6-10, but for a system having multiple components of the same type.
Figure 12:
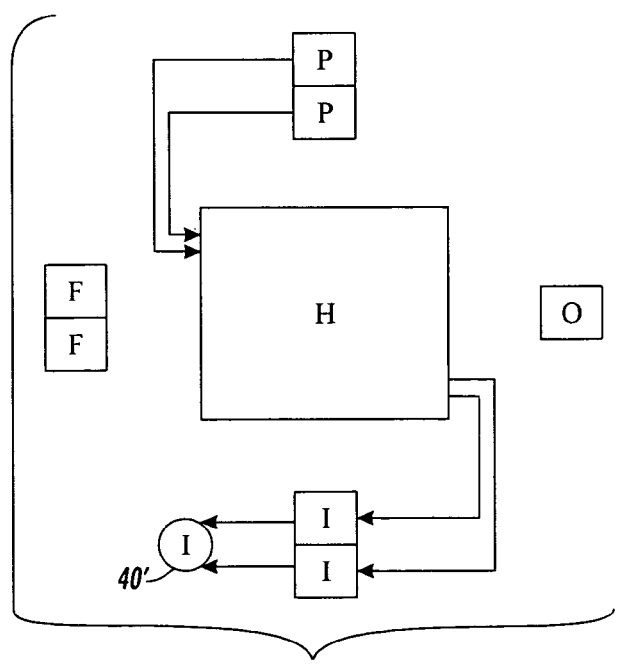
Figure 13:
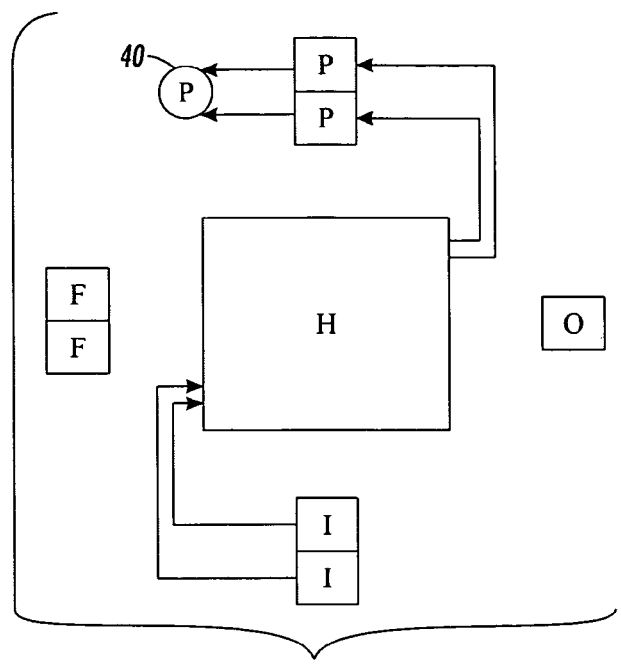

More particularly, FIG. 11 illustrates a first flow (Flow 1) for a machine with multiple feeders 22, 22', print engines 24, 24', inverters 26, 26', and an output 28 and highway 30. The flow of FIG. 11 is essentially the same flow as that of FIG. 6. Particularly, sheets from feeders 22, 22' are passed to the highway 30, which in turn provide sheets to print engines 24, 24'. FIG. 12 corresponds to FIG. 7, where the sheet paths go from print engines 24, 24' to highway 30, and then to inverters 26, 26'. FIG. 13 takes the sheets from inverters 26, 26' back to highway 30, and to print engines 24, 24'. Thereafter, FIG. 14, similar to FIG. 9, provides the process flow of the sheets from print engines 24, 24' to highway 30, and back to inverters 26, 26'. And lastly, the reinverted sheets at inverters 26, 26' are moved on highway 30 to output 28.

FIGS. 11-15 are different from the flows of FIGS. 6-10 in that multiple similar components are in the system (while in FIGS. 11-15 two feeders, printers and inverters are shown, it is to be understood the system can include the components in different numbers).

Another concept which distinguishes FIGS. 11-15 from FIGS. 6-10 is the presence of artificial nodes 40, 40', which are implemented to address the issue of how to form the abstract network flow model in a manner which maximizes the total process flow of the entire system, and not just the amount for any individual component. The addition of artificial nodes 40, 40' are provided to accumulate and track the amount of flow occurring to components of the same type. Particularly, a job of the abstract network flow model might be to determine the maximum amount that can be printed by the system as a whole. Thus, artificial print engine node 40, would be used to determine the total printing output capacity of print engines 24, 24', even when print engines 24, 24' may not be used equally or there is some other obstacle which lowers the capacity of one or both. It is to be appreciated that while helpful conceptually, these artificial nodes can ultimately be eliminated from the formulation. This is because the method and system imposes equality constraints on each node linked to an artificial node, which enforce equality between its input flow at one stage, and its output flow in the next stage. This concept will be expanded upon below.

For example, the path to print engine 24' may have more constraints than the path to print engine 24, or print engine 24 may simply have a smaller printing capacity. However, in the present application the amount an individual print engine is able to process is not the main point of the investigation. Rather, the concern is the potential output of all the print engines represented by the print engine node 40.

Figure 14:
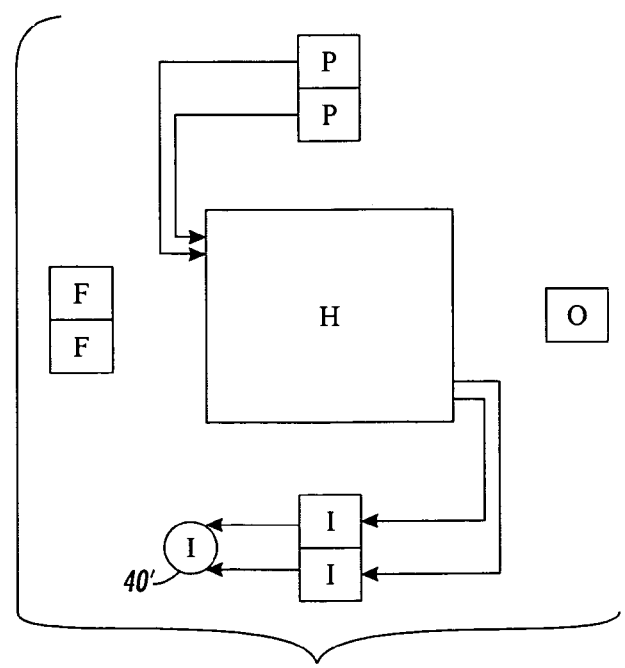
Figure 15:
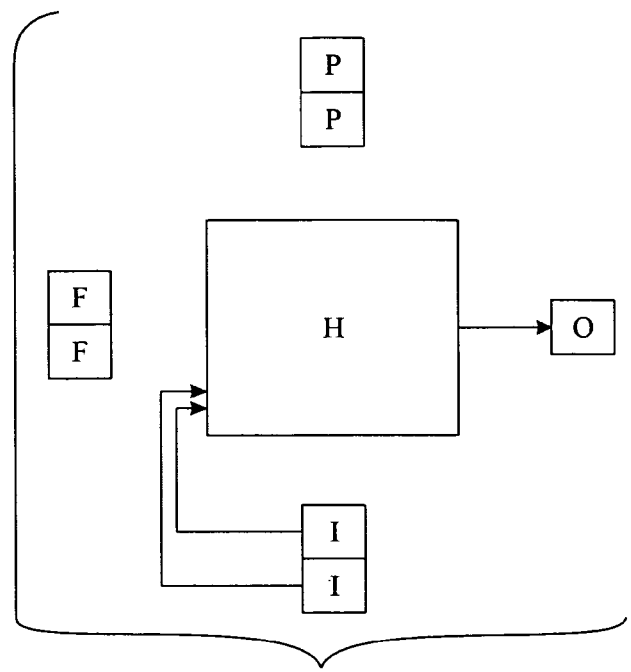

FIGS. 11-15, and more particularly, FIG. 12, shows that an artificial inverter node 40' is provided to collect the maximum output capacity flow through inverters 26, 26'. FIGS. 13-15, set forth the remaining flows, having artificial nodes identified at appropriate locations.

One constraint on the flows of FIGS. 11-15 is that for whatever amount of a commodity that flows into a node, an equal amount must flow out. Therefore, in FIG. 11, the amount of flow which enters print engines 24, 24', must be equal to the outflow from print engines 24, 24', as shown for example in FIG. 12. Thus, if the work that normally could be accepted by the print engines is equal, but for some reason print engine 24 could now only accept one half of the flow, then it would be necessary that only three-fourths of the previous (i.e., maximum) flow would come out of print engine node 40. Thus, while the process uses the artificial nodes to determine the overall flow from similar components, the process of the tool may also constrain the components individually, in order to provide an accurate reflection to the physical world.

Moving from one flow, such as in FIG. 11 to FIG. 12, the artificial nodes move to where the process is inputting work. For example, since in FIG. 11 flow is entering print engines 24, 24', the artificial node is at the output, i.e., 40 of the print engines. Then in FIG. 12 where the process flow moves from the print engines to the inverters, the artificial node is at the output of the inverters, i.e., 40'. More particularly, when looking at FIGS. 11 and 12, when the flow of FIG. 11 is cascaded with the flow of FIG. 12, artificial node 40 is not shown, and the artificial node 40' is depicted. It may be noticed there is no artificial node at output 28. This is the case since in the examples of FIGS. 11-15, only a single output was provided. However, if multiple outputs were in the system, an artificial node would be used.

Figure 16:
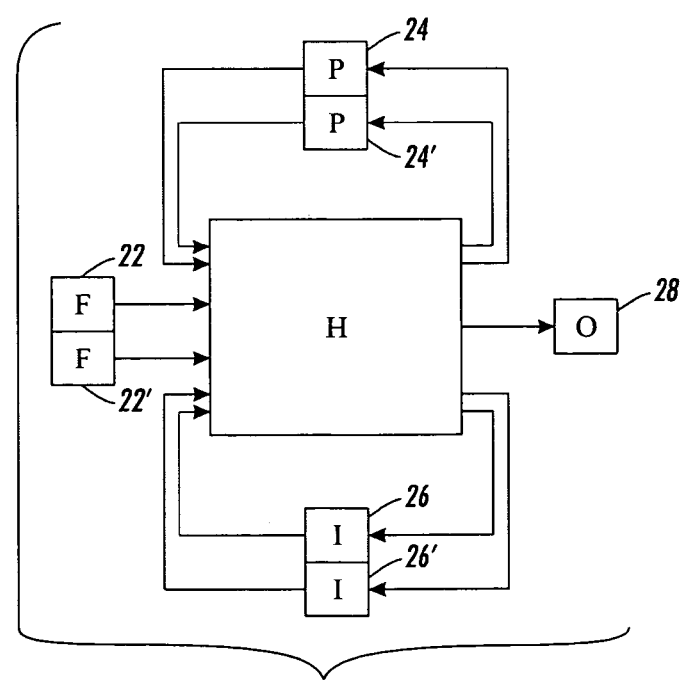
FIG. 16 illustrates an aggregated constraint multi-commodity flow for FIGS. 11-15.

FIG. 16 illustrates an aggregated constrained multi-commodity flow which "stacks up" the individual flows of FIGS. 11-15. This is similar to the aggregated flow of FIG. 5.

Figure 17:
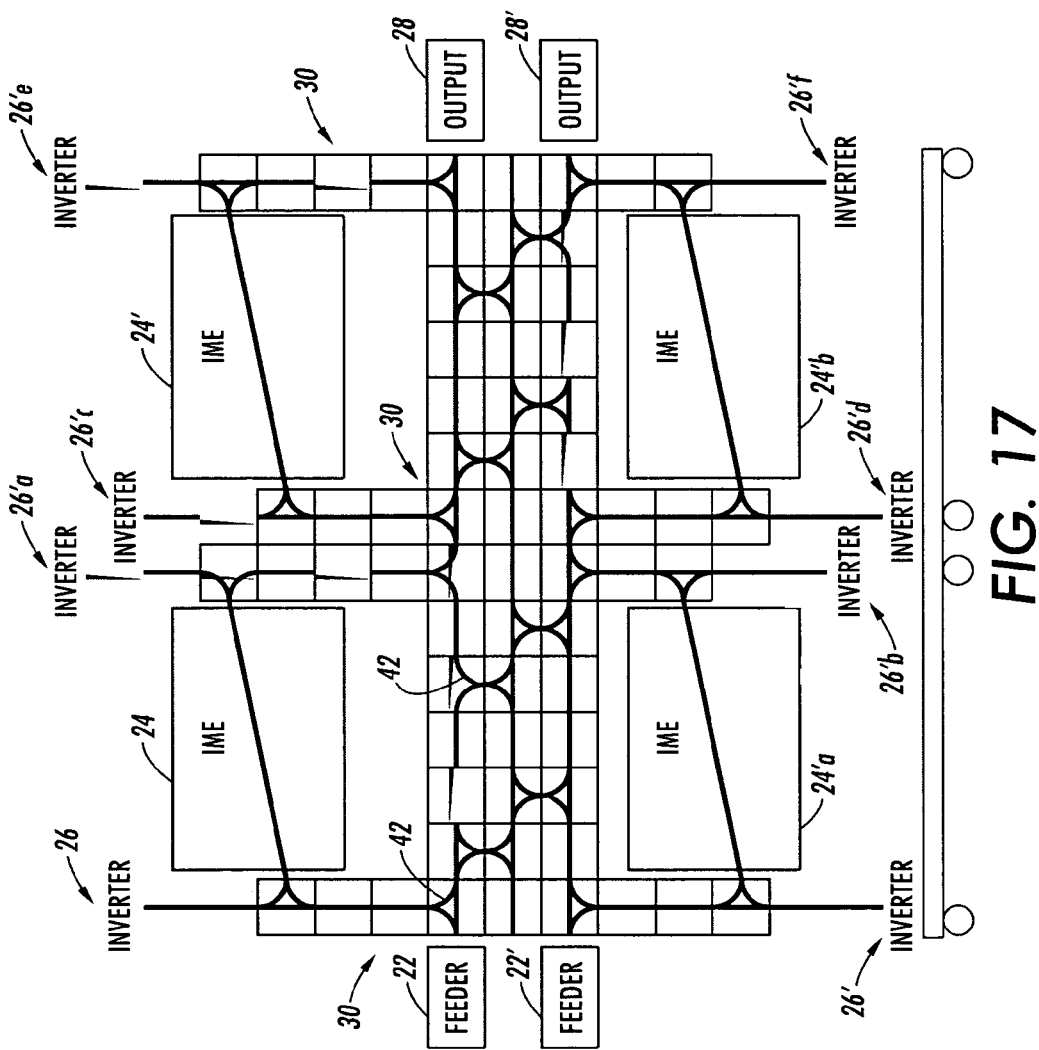
FIG. 17 is a realistic model of a four-print engine printing system having unequal numbers of similar components.

Turning to FIG. 17, illustrated is a simplified realistic model of a print system having four print engines and an unequal amount of similar components. In this realistic model, there are two feeders 22, 22', four print engines 24, 24', 24'a and 24'b, eight inverters 26, 26', 26'a, 26'b, 26'c, 26'd, 26'e and 26'f, as well as two outputs 28 and 28'. Additionally, the highway 30 is shown having multiple paths with switches 42, to permit refined control of sheet movement through the highway 30. When such a model is formed as an abstract network flow model, the various similar components (e.g., feeders, inverters, print engines and outputs) are bundled with like devices as artificial nodes.

In a well-designed system, the highway does not provide any bottlenecks. Therefore, the optimized output will commonly be constrained to the maximum output of the print engines. For example, in FIG. 17, the ultimate output would be the speed at which the four print engines 24, 24', 24'a and 24'b operate. Alternatively, if highway 30 is not designed efficiently, or there is a breakdown in any of the components (e.g., print engines, inverters, feeders, etc.), it may not be possible to reach the maximum potential output of the print engines and in this case the system will be constrained by issues other than the print engine speeds.

As previously mentioned to develop the abstract network flow model, the individual flows are combined, and constraints are provided. Two particular types of constraints include the previously discussed requirement that whatever goes into a particular component (or group of similar components) in one flow, must equal what comes out of that component (or group of similar components) in the next flow. A second constraint is that each of the flows are moving through the highway 30 at the same time. So this multi-commodity formulation problem captures the fact the highway is a resource all the flows need to share. For example, if the highway had a link (e.g., link A), and if a Flow B sends four sheets through link A, and then a Flow C sends five sheets through link A, then link A needs to have a capacity of nine sheets (e.g. 4+5=9). Thus, while the above identifies two constraints, other constraints may also be applied, and these two are given only as examples. Further, when the present network flow tool is used in a manufacturing environment other than a printing system, still other constraints may be appropriate.

With continuing attention to FIG. 17, highway 30 is depicted by a grid of boxes with lines drawn therethrough. Some of the lines of the highway are shown as passing through larger blocks representing the print engines (24, 24', 24'a and 24'b). The lines going through the print engine blocks indicate that the print engines have a finite capacity. Particularly, at a more detailed flow level, network flow modeling employs only two objects (links and nodes), and it is accepted practice to represent bottlenecks or capacity constraints as links. So the print engines themselves (as will be detailed hereafter) are represented as links, which may or may not be bottlenecks, depending on the relative capacities between the connectivity part of the highway and the capabilities of the actual print engines. The inverters, feeders, outputs and other components will also be represented as links.

Turning to FIGS. 18-22, illustrated are maximum abstract network flow model solutions of five flows, as related to the physical representation of the printer system of FIG. 17. Also, FIG. 23 depicts the aggregate of the five flows. It is appreciated the content of FIGS. 18-23 appear different from the previous representation of the abstract network flow models, as shown for example in FIGS. 11-16. The difference in these drawings is due to the fact that FIGS. 18-22 are presented at a level more detailed that those of FIGS. 11-16 and in more strict adherence with traditional representations used in network flow optimization, i.e., as a graph with nodes connected by links.

Figure 18:
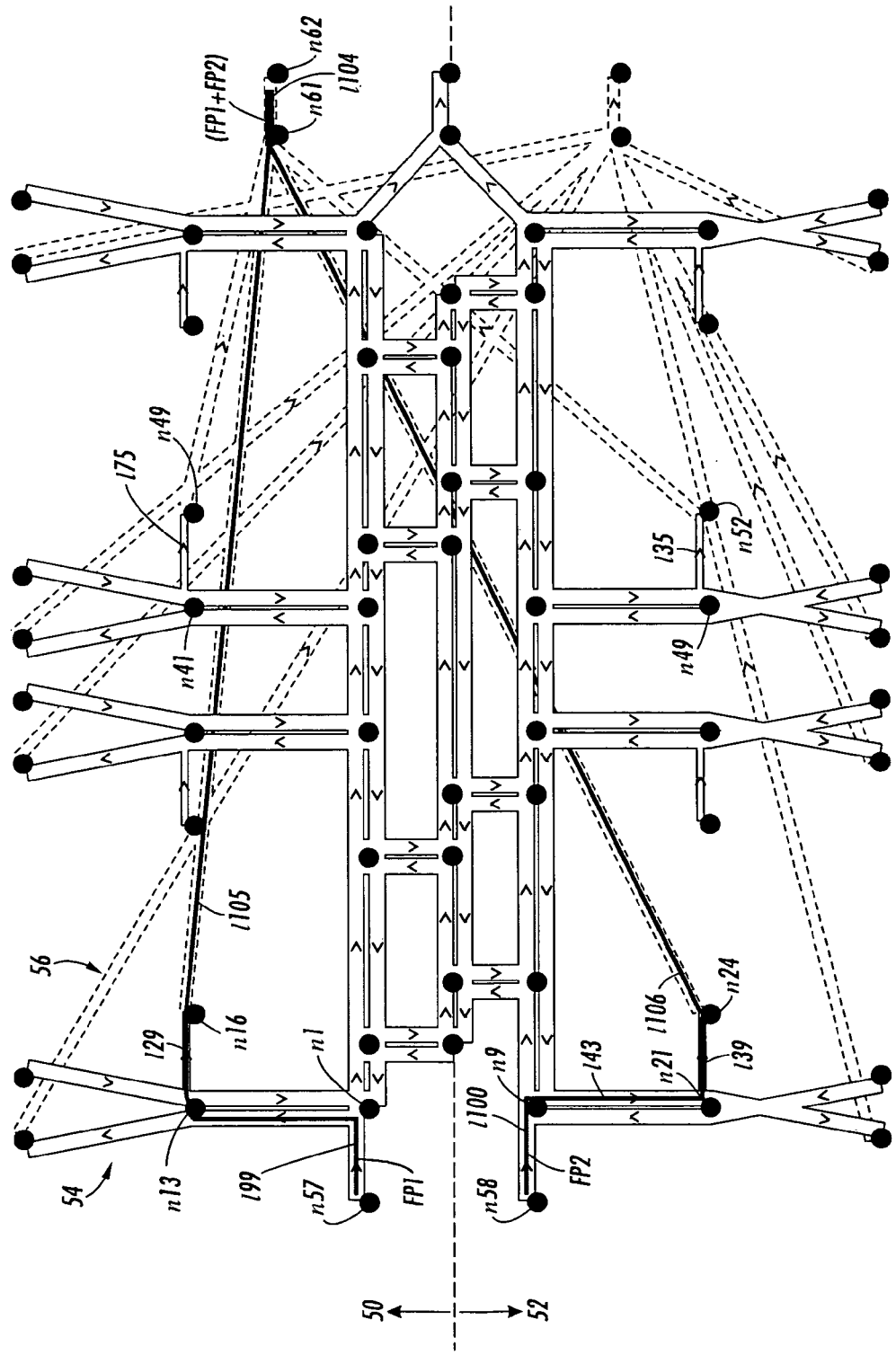
FIGS. 18-22 depict the five flows for the realistic model of FIG. 17, in a more traditional and detailed network flow model.

With initial attention to FIG. 18, depicted is an abstract network flow model for a first flow (Flow 1), which provides sheets from the feeders (e.g. 22, 22' of FIG. 17), to selected print engines (e.g. 24, 24'a of FIG. 17). As can be seen, there is a certain symmetry to the flow model of the printing system, where the printing system includes an upper half 50, and lower half 52. Also included are highway paths 54 (drawn as solid paths and which represent the highway lines of the previous figures) and artificial node paths 56 (drawn as dashed paths and which lead to and are representative of the artificial nodes of the previous figures).

In Flow 1, nodes n57 and n58 represent outputs of the feeders (e.g., 22, 22'). As can be seen, the flows are designated as a first or upper flow path FP1 and a second or lower flow path FP2. The flow of first or upper flow FP1 will initially be discussed. A sheet from feeder output n57 travels to node n1 via link l99, and then from node n1 to node n13 via link l33. This represents movement of the sheet on the highway. Next the sheet is represented as going through a print engine (e.g. 24 of FIG. 16) represented by link l29 which is between node n13 and node n16. The thickness of the flow path FP1 through link l29 is about one quarter that of the highway path, indicating the highway is not a bottleneck at this point, and therefore the main bottleneck will be the print engines. This may change if, for example, any of the highway paths break down or are otherwise constrained. With attention to lower half 52, a sheet exits the feeder output node n58, and moves through link l100, to node n9, and from node n9 to node 21, through link l43. The sheet then moves through link l39, which represents a print engine (e.g. 24'a of FIG. 17), where link l39 is located between nodes n21, n24.

The output of the print engines (i.e., represented by links l29 and l39) are provided to the artificial node paths, represented by links l105 (between nodes n16 and n61) and l106 (between nodes n24 and n61), respectively. These node paths in turn deliver the sheets from the first flow path FP1 and the second flow path FP2 to link l104 (which represents artificial print engine node 40 of FIG. 17), located between nodes n61 and n62. Thus, the flow has gone from the feeders to the input of print engines, and then extends into the background flow of the virtual nodes. At link l104 it can be seen the combined first flow path FP1 and second flow path FP2 is only about half as thick as link l104, which indicates the artificial print engine node link l104 (i.e. node 40 of FIG. 17) has additional capacity. In particular this additional capacity is the capacity of the remaining, yet to be used print engines of the system (e.g. print engines 24' and 24'b of FIG. 17). Thus, FIG. 18 provides results of the optimization problem, for Flow 1, which can be processed without interfering with the additional flows (i.e., Flows 2-5).

It is to be appreciated the solution for the Flow 1 needs to take into consideration potential future flows, such as Flows 2, 3, 4 and 5. If all that the flow diagram software considered was maximizing the first flow (i.e. Flow 1), it would have used all four print engines to move the sheets through the system during this first process. Particularly, print engines 24' and 24'b would have been used, represented in the present abstract network flow model as link l75 (between nodes n41 and n44), and link l85 (between nodes n49 and n52), respectively. However, the optimization software selected for use with the present concepts includes the capability of taking into account that additional flows are going to require use of these print engines' capacities.

The optimization program understands this requirement due to imposition of this knowledge through the application of the constraints. So when Flow 1 is being optimized, Flows 2,3,4,5 are also being optimized. Thus, the optimization software optimizes all the flows at the same time, with the knowledge that they interact through boundary constraints and through the constraints on the link capacities. There are a large number of optimization programs which may be appropriate for implementation of the present concepts. Particularly, currently the present network flow tool has been developed in Matlab, which in turn calls either the Matlab or a CPLEX linear programming solver. However, of course, other solvers may be used to implement the concepts of the present application. CPLEX is a high-performance linear programming (LP) and mixed integer programming (MIP) solver from Ilog, Inc. of Gentilly, France. Matlab is a product of MathWorks of Natick, Mass.

Figure 19:
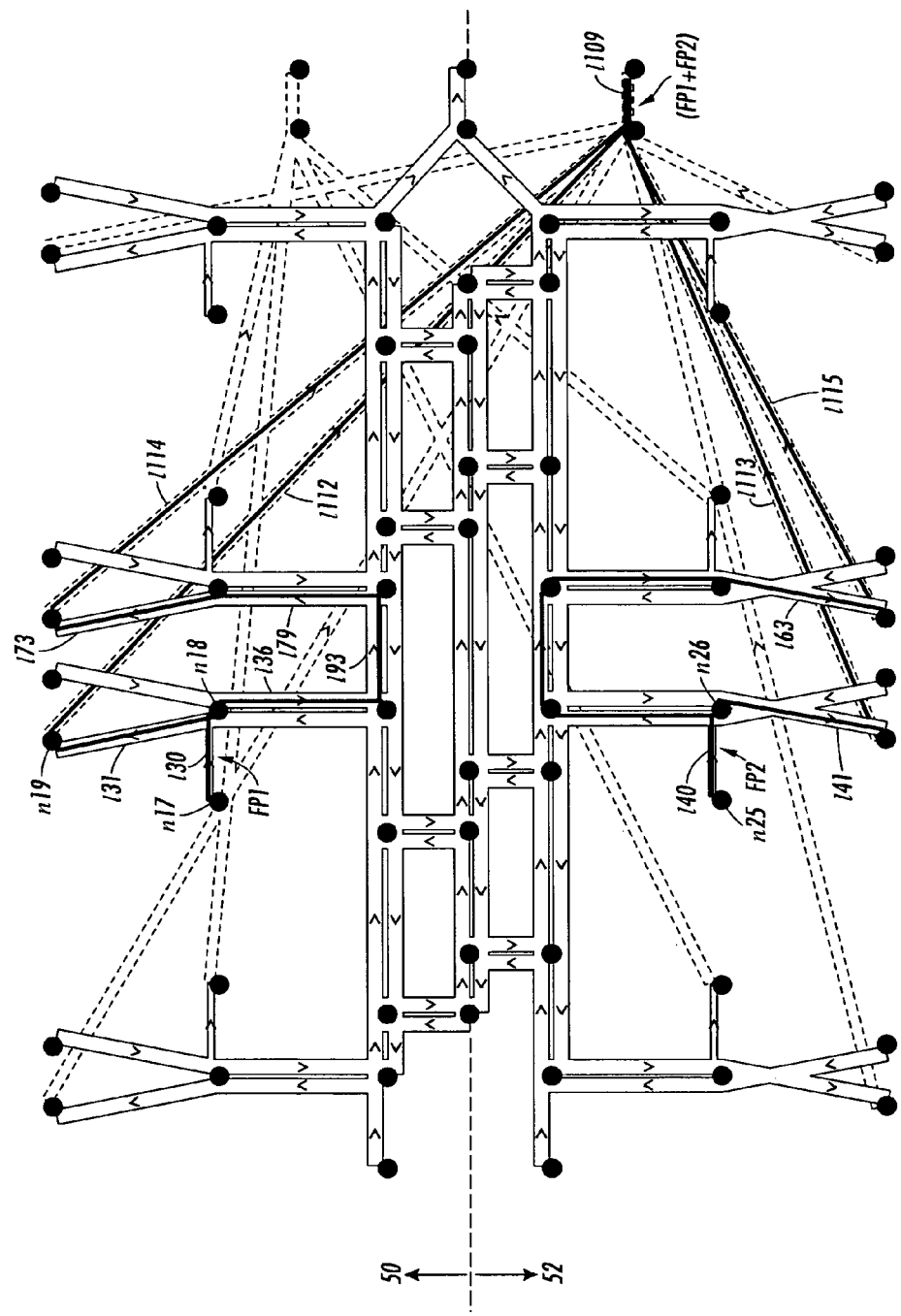

Turning to FIG. 19, the second flow (Flow 2) is from the print engine to the inverters. So Flow 2 depicts going from the output of the print engines to inverters. The inverters are represented by the Y-shaped legs extending from the top and bottom portions of the model. The inverters are modeled as bi-directional components with one leg of the Y representing flow entering the inverter (which then enters the artificial inverter node) and the other leg represents flow coming out of the inverter and re-entering the highway. Flow 2 of FIG. 19, again operates within the constraint that anything that has gone into a component must come out of the component.

Therefore, link l30 between nodes n17 and n18 represent the output from a print engine (e.g. print engine 24 of FIG. 17), and link l40, between nodes n25 and n26 represent the output from another print engine (e.g. print engine 24'a of FIG. 17). These are the flows coming out of the print engines, and need to find their way to inverters. What can be seen by Flow 2 of FIG. 19, is the optimization program has determined to split the flow from the two print engines between two sets of two inverters symmetrically. It sends half of the flow from print engine link l30 (from the upper half 50 of the diagram) immediately to link l31 (e.g. inverter 26'a of FIG. 17) between nodes n18, n19, and the other half to link l73 (e.g. inverter 26'c), via links l36, l93 and l79. The other half of the flow from print engine link l40 (from the lower half 52 of the diagram) is sent to inverter links l41 (e.g. inverter 26'b of FIG. 17) and l63 (e.g. inverter 26'd). From these links, the flow path is to artificial node path links, l114, l112, l113, and l115, respectively. These artificial node path links l114, l112, l113, l115 result in both first flow path FP1 and second flow path FP2 converging on the artificial inverter node link l109.

Figure 20:
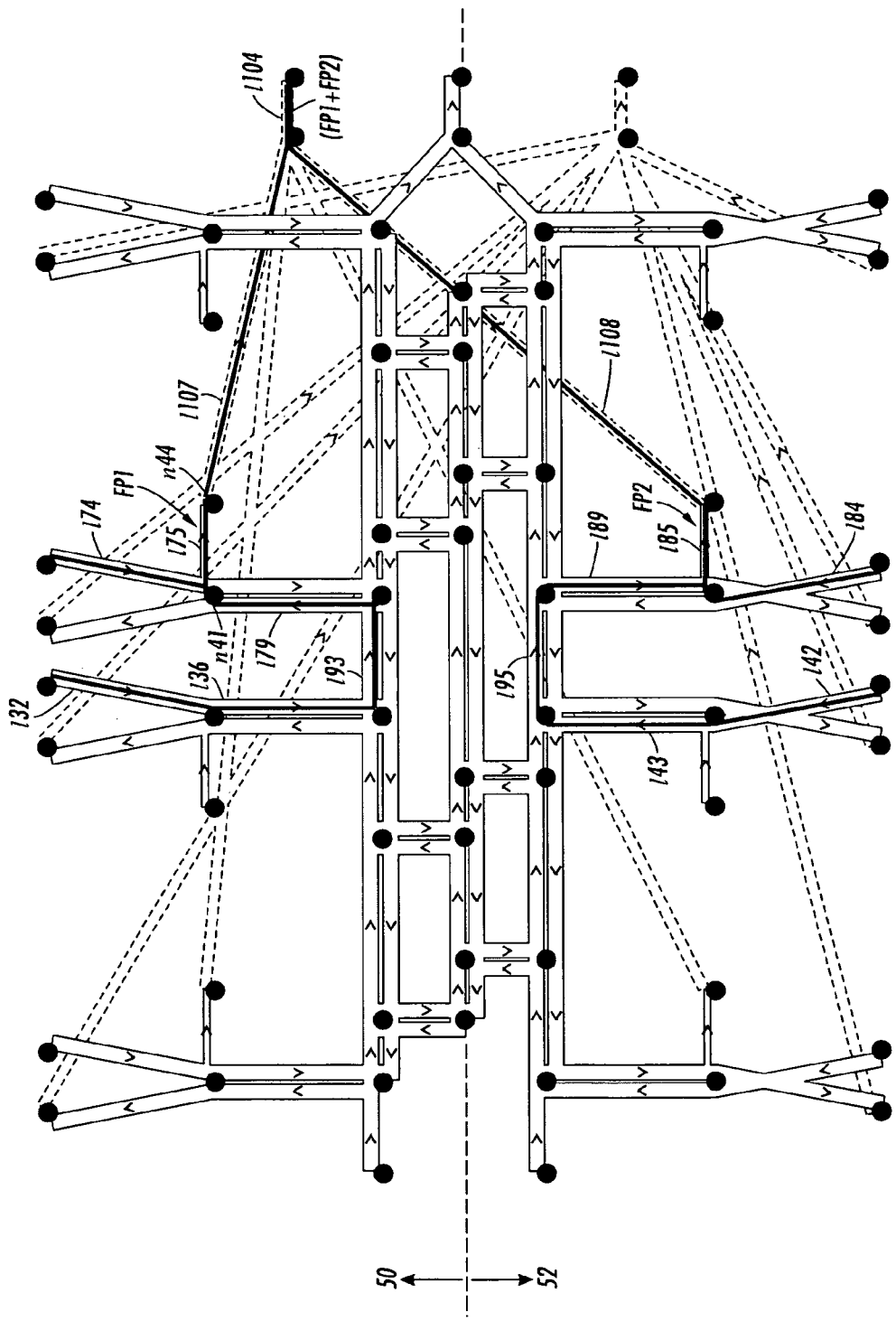

Turning to FIG. 20, depicted is Flow 3 which illustrates the solution for the next flow of moving the sheets from the inverters to other print engines. In this process the flow path moves the sheets from the outputs of the inverter links which are the other legs of the Y formed inverters, mentioned in FIG. 19. For example, in the top half 50 of the model, inverter link output l32 and highway links l36, l93 and l79 provide an output path to node n41, and output from a second inverter is provided to node n41, via inverter output link l74. This provides the path to the input of another print engine represented by link l75 between nodes n41 and n44 (e.g. print engine 24' of FIG. 17). Thereafter, the path moves to the artificial print engine node path link 1107, which leads to the artificial node represented by link 1104 A similar path flow is occurring in the lower half 52 of the diagram. Particularly, a first path from one of the inverters is defined by links 142, 143, 195, and 189, and a second path from another inverter is defined by link 184, both leading to the input of print engine link 185 (e.g. print engine 24'b of FIG. 17). The path then moves to the artificial print engine node path link 1108, which leads to the artificial print engine node represented by link 1104. By this design the outputs of print engine links 175 and 185 are accumulated (FP1, FP2) at the print engine node link 1104.

The print engines in this situation are the second stack of print engines (i.e., 24' and 24'b). The width of the sheet flow path (FP1, FP2) at artificial node link 1104 is approximately half the size of the width of the artificial print engine node link 1104, itself. This is true, since the other half of the capacity for the artificial node was used in the first flow (Flow 1). This shows that as the optimization program is working, as it is keeping a count of the total (or aggregate) amount of flow that is going through the print engines. In that way, the optimization program maintains a check to ensure the system is not exceeding total print engine capacity.

Figure 21:
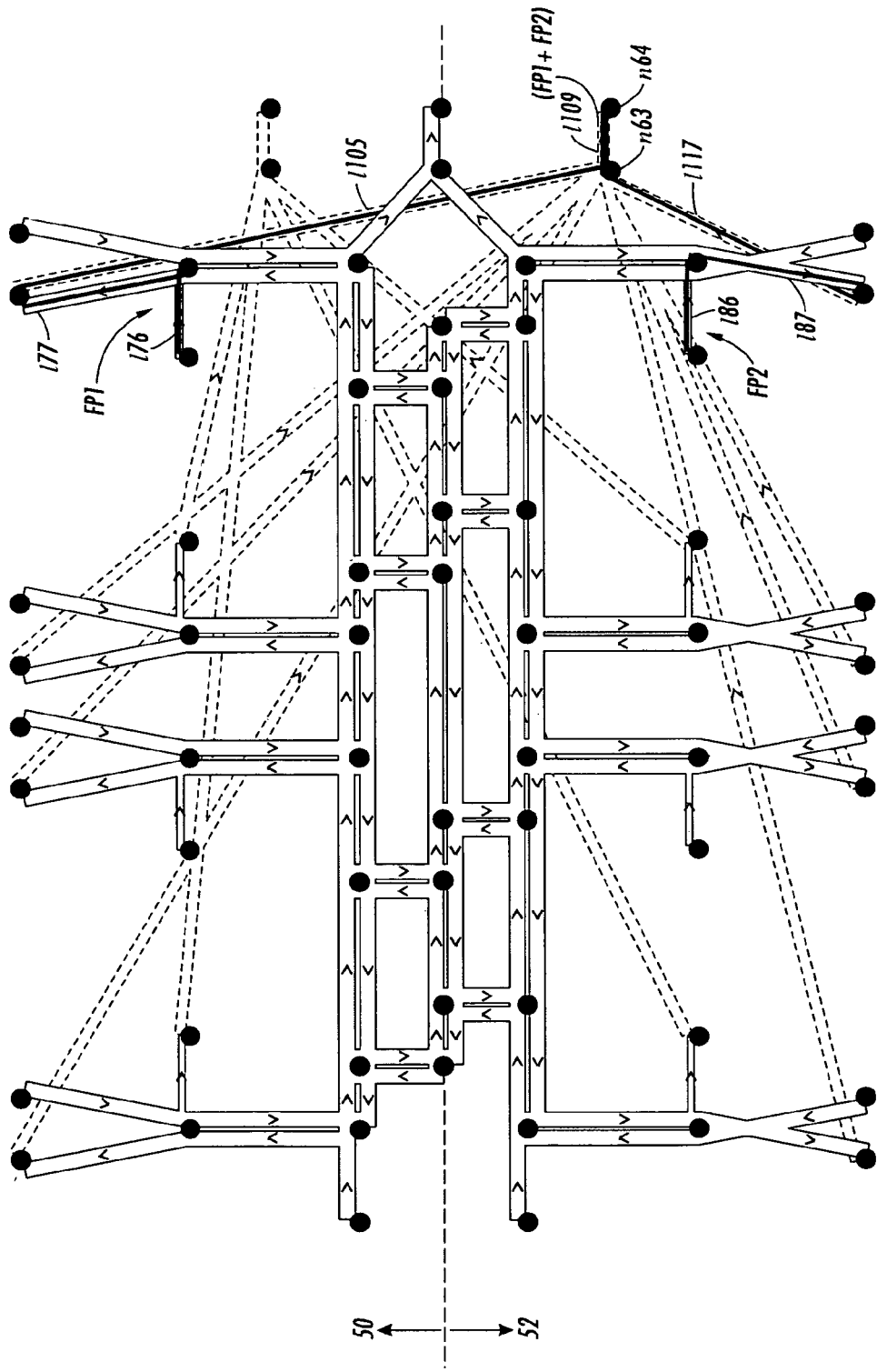

Turning to FIG. 21, shown is Flow 4, which goes from the output of the print engines, which in this case are shown by links 176 (upper flow) and 186 (lower flow). The output from the print engines is provided to the inverters representative by links 177 (upper flow) and 187 (lower flow), and the process then moves (FP1, FP2) to artificial print engine node path links 1105, 1117, to artificial print engine node link 1109, between nodes n63 and n64.

Figure 22:
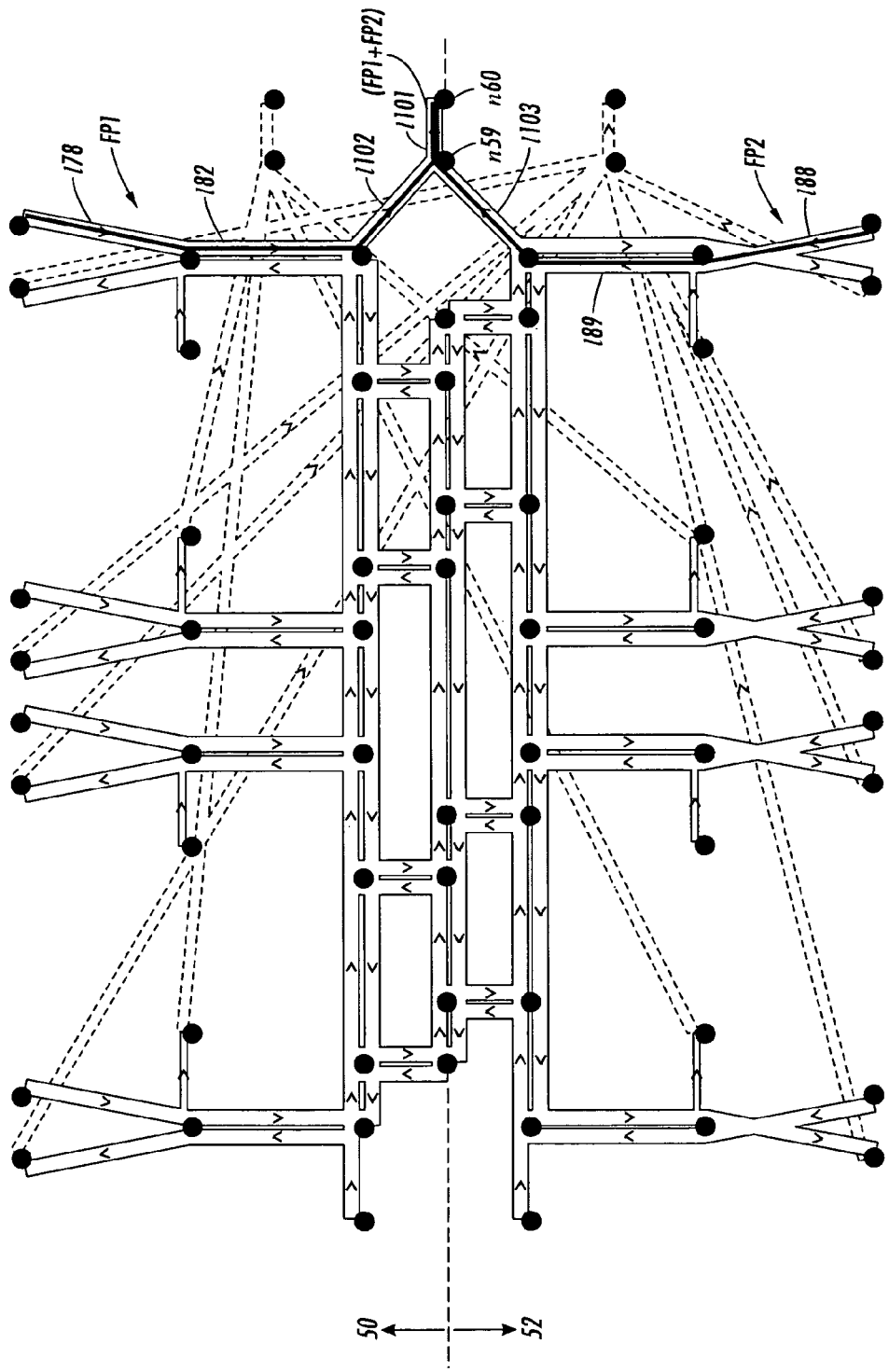
Figure 23:
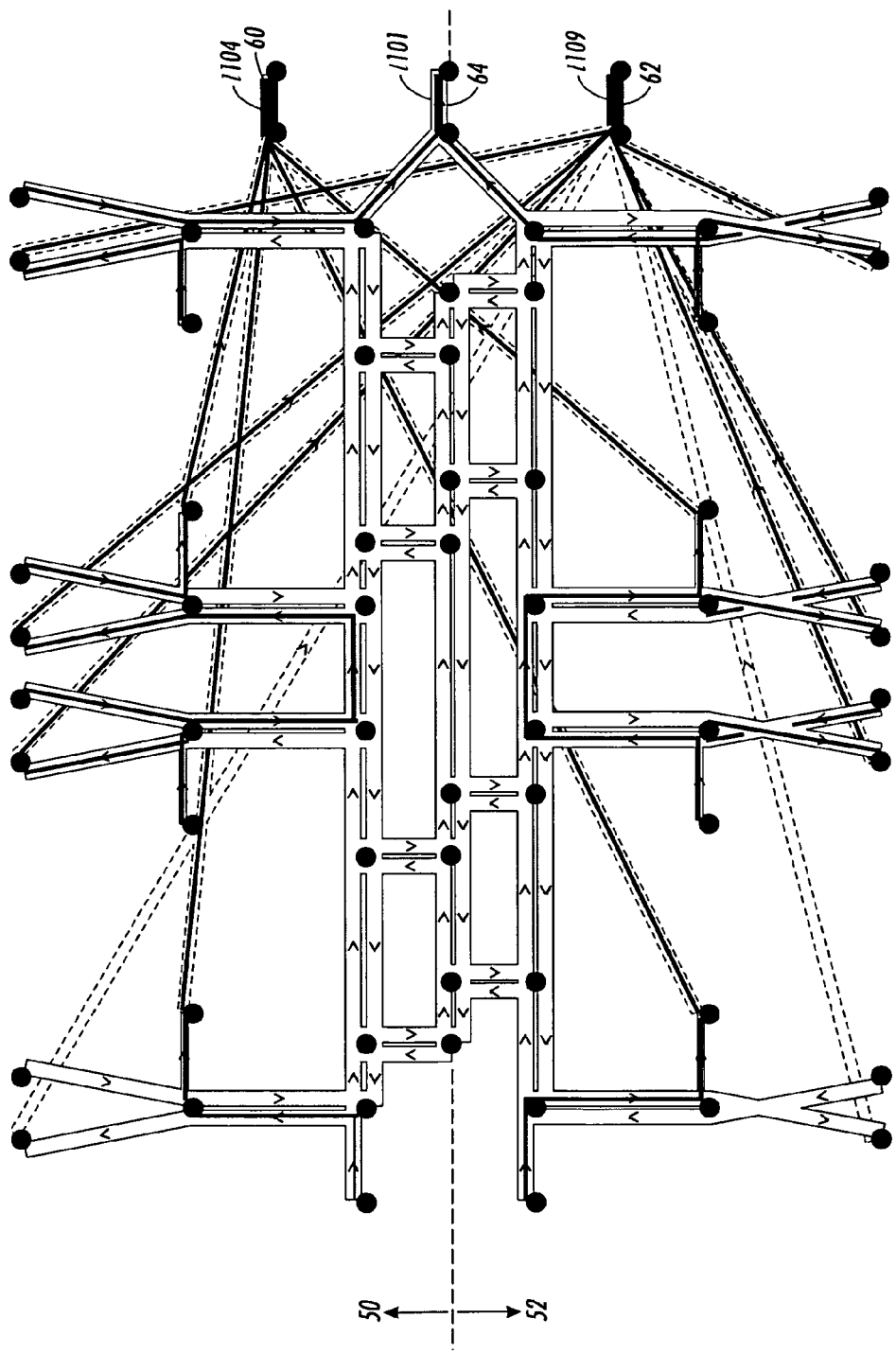
FIG. 23 depicts the aggregated flows of FIGS. 18-22.

Finally, in FIG. 22 Flow 5 represents the flow from the inverters 178 (upper half) and 188 (lower half) through the highway (182, 1102 for the upper half, and 189, 103 for the lower half) to the output (FP1, FP2) represented by output node link 1101, between nodes n59 and n60.

Turning to FIG. 23, illustrated is the aggregate maximum flow solution of the flows shown in FIGS. 18-22. This network flow model depicts two five step flows where the individual flows of FIGS. 18-22 have been cascaded together by the imposed constraints. FIG. 23 also illustrates the capacity of the artificial print engine node link 1104 and the artificial inverter node link 1109 are at maximum throughput. This is shown in FIG. 23 since the total print engine sheet flow (FP1, FP2) and the total inverter sheet flow (FP1, FP2) at the respective links 1104 and 1109 are as thick as these links.

The amount of flow in a link is attempted to be illustrated by the figures. For example, it may be observed that the thickness of the final output flow on link 1101 is equal to the sum of the flows on the input links 199 and 1100. It is also shown that the output flow on 1101 is half of that on the link of the artificial node 1104, since each sheet exiting the printer must be printed twice. Note that the flow on the print engine links is as thick as the links themselves, showing that the machine is being used to the full capacity of the four printers.

Figure 24:
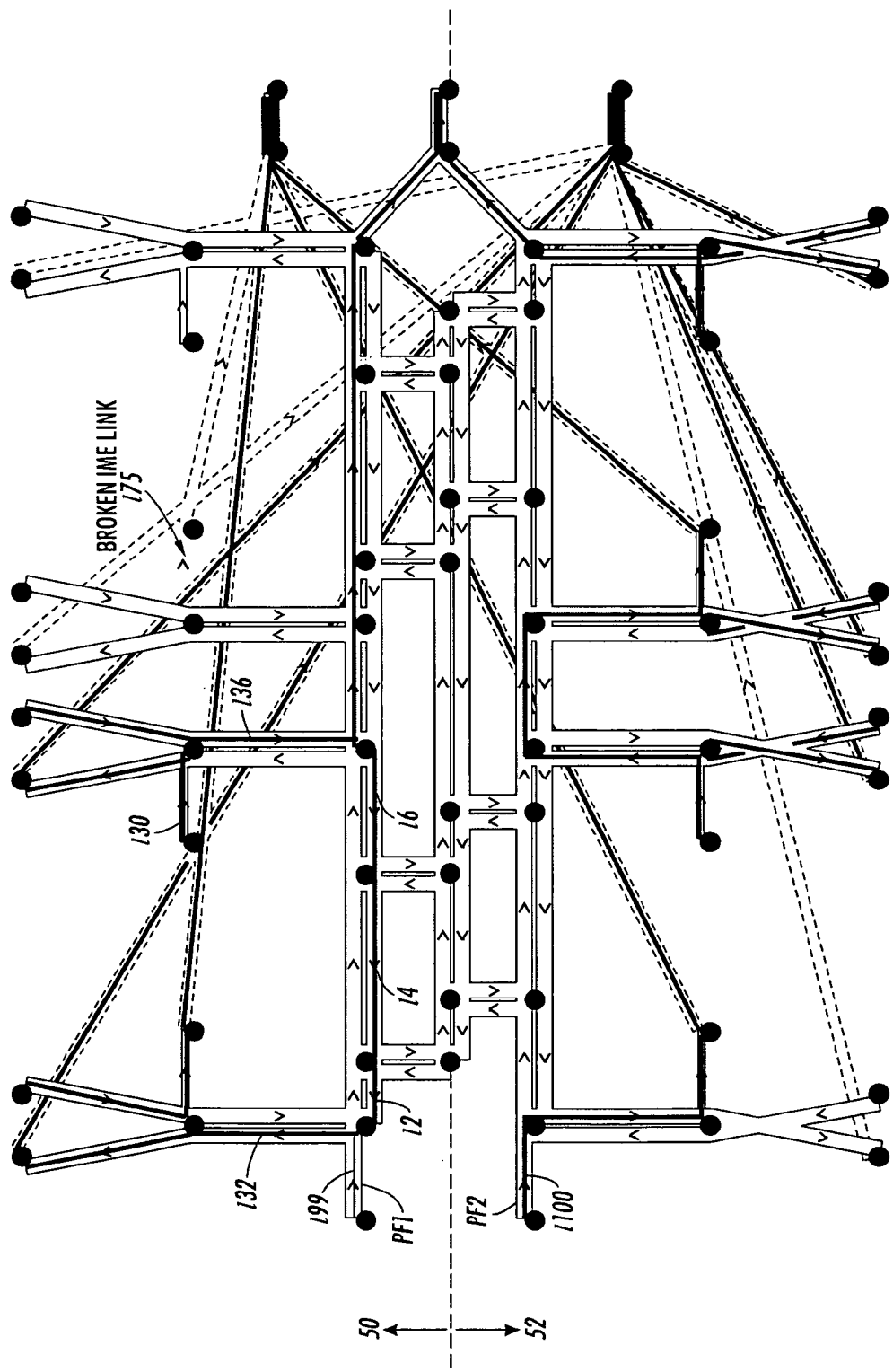
FIG. 24 illustrates the network flow model of FIG. 23, with a print engine of the device shown as being inoperative or broken.

As previously mentioned, the above operations are computed by an appropriate optimization program. Once an optimization framework, which computes reasonable processes and paths, has been generated the framework can be used to address issues where the paths or components are not operating as expected. For example, in FIG. 24, it is considered the print engine represented by link 175 (e.g. print engine 24') is somehow broken. This is identified in the FIGURE by the designation "Broken IME link." In the situation of FIG. 24, the mode specifies the capacity for the print engine represented by link 175 to zero, meaning no sheets (or flow) can go through the link. In placing this additional constraint, the optimization program then operates to obtain the set of flows which produce a maximum system output with link 175 broken. As illustrated in FIG. 24, the flow on the bottom side 52 is maintained as before. However, the flow on the upper side 50, has been altered. Particularly, remaining print engine 129 (e.g. 24 of FIG. 17) is being used as a double-sided printer. Thus only half as much flow (sheets) is coming out of the top feeder link 199 (e.g. 22 of FIG. 17), as the bottom feeder link 1100 (e.g. 22' of FIG. 6). This is shown by the flow FP1 within link 199 being half as thick as the flow FP2 within link 1100. So in this process, for the upper half 50, the sheets go through the first print engine link 129 and then loop from the output of the print engine link 130, through the inverter links 131 and 132 (as well as to the artificial inverter node link 1109) and back around through highway links 136, 16,14, 12 and back through 132. This looping brings the flow back to the print engine 129 to print the other side of the sheets. Therefore, the optimization program provides a reasonable operation of using the upper print engine link 129 as a dual-sided print engine where it runs the upper flow through the same print engine twice, whereas the bottom flow maintains the process where one print engine prints one side, and a second print engine prints a second side.

Figure 25:
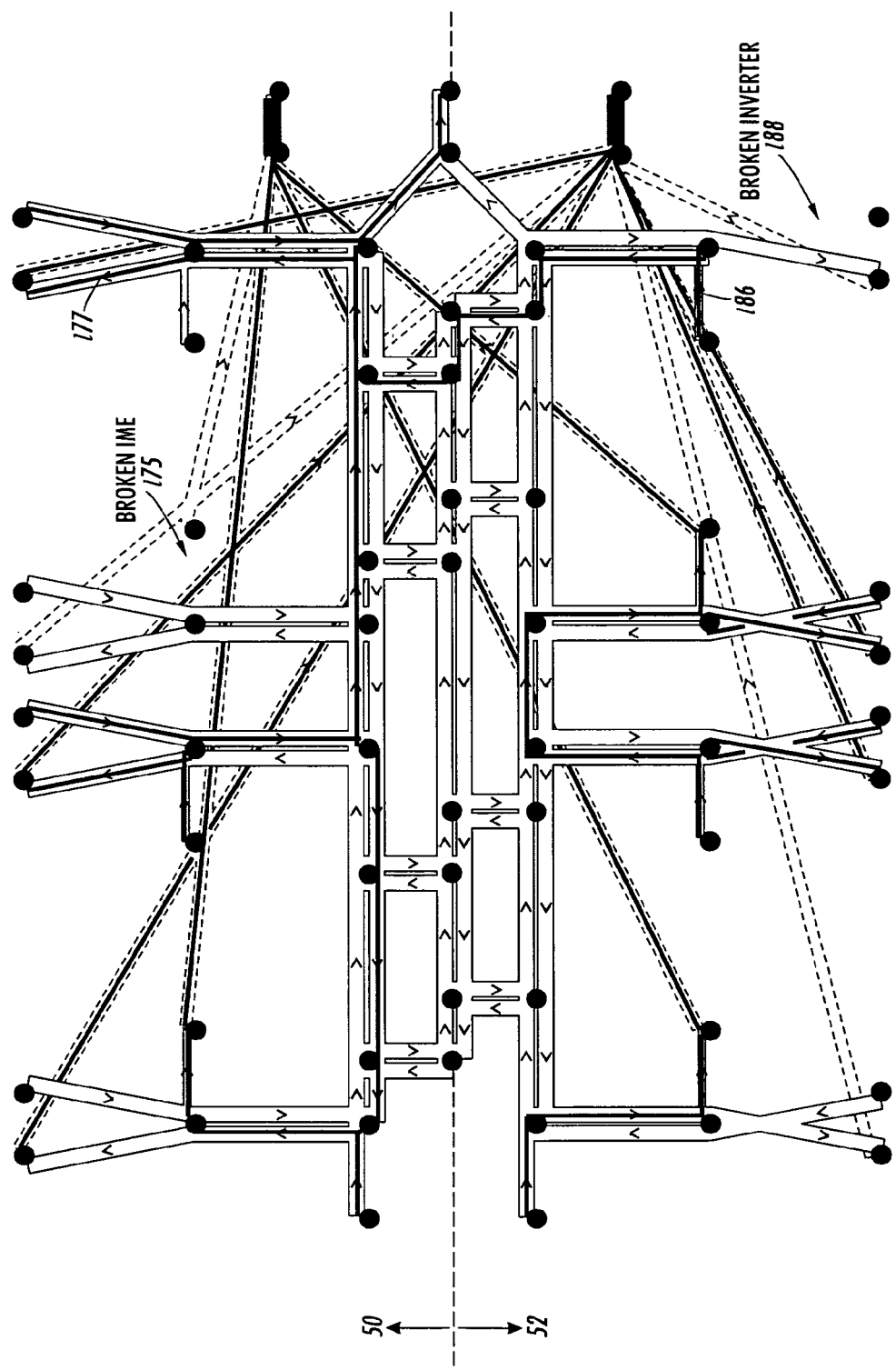
FIG. 25 sets forth the network flow model of FIG. 23, with an inoperative or broken print engine, and an inoperative or broken inverter.

Turning to FIG. 25, shown is a second example where the system will address broken parts within the print system. For example, in this FIGURE, the print engine link 175 remains broken, and in addition inverter link 188 is shown as a "Broken Inverter". These additional constraints are used by the optimization program to produce another flow process which permits the maximization and utilization of the system in view of the broken items. In this case, the flow might not be as obvious as that in the first example of FIG. 24. In this situation, for example, the bottom right print engine link 186, moves the sheets through the highway up to the upper right inverter link 177. It takes this path, since the flow needs to be inverted, but its most immediate inverter (i.e. 188) is broken. So the optimization program finds an available inverter (i.e. 177), which happens to be in the upper portion of the flow diagram.

The above processing shows that by implementing a network flow model process which provides optimization when the system is operating appropriately, the system can also use the network flow model to alter the process flow when constraints such as broken components exist.

The preceding discussion has been about flows. It is understood, of course, that sheets in the physical world are discrete objects and are not fluid. Therefore in reality the results of the described processing does not always result in a plan which can actually be used when working with discrete components. This is true since in some instances the process flow of the above-described mechanism might require two sheets to flow through each other (which would be possible in a fluid system, but of course is not when working with discrete components). This situation can occur due to relaxation of the constraint that the components are discrete.

While this tool may not always provide real world usable plans, it does capture steady-state behavior, which is not achieved using existing conventional discrete planning/scheduling procedures. Particularly, discrete systems will have certain ramp-up transients while the system is being filled-up, and possibly ramp-down transients when the system is ending. Due to this situation, obtaining a steady-state view of a discrete system model by use of existing optimization tools is difficult, and if it is obtainable it will take an extended period of operating the system so it is able to eliminate the transients and allow the model system to enter a steady-state. In view of the above, existing discrete scheduling programs do not provide information about the operations that conveniently reveal what the system model is doing on average. The present network flow tool however; approximates average process flows by formulating all process flows and components as steady-state elements from the beginning of the process, resulting in quickly obtaining a best case estimate of what the optimized output of the system may provide at a steady state. Thus, by removing the constraint that the components (e.g., sheets) are discrete elements the planning problem is made easier, at least from the optimization point of view.

The present method and system permits for the link capacities themselves to be functions (e.g., any linear or concave function) of other variables (e.g., power consumption, etc.) of the system under investigation. Particularly, the optimization techniques and framework of the system and method can optimize within the constraints (e.g., the maximum power consumption cannot exceed some selected maximum power value) of the additional variables. This feature may be implemented in the present method and system by adding the additional variables (e.g., power variables for each machine or link) to the decision making process, by adding the additional constraints of the new variables to the constraints of the existing abstracted network flow model or problem.

A particular implementation of such a tool is in conjunction with a scheduler which attempts to schedule processes (e.g., jobs) for discrete components, by maintaining the constraint of the components being discrete components. Use of the network flow tool in this implementation is beneficial at least in part because the process of computing real world discrete schedules is often a combinatorial and difficult branch and bound (state space) type problem, which means the problem can become very large very quickly. The presently described network flow tool can be used to eliminate branches in such branch-type searching, reducing the area which needs to be investigated. When this tool is used with a discrete planner/scheduler, it can therefore reduce the need to investigate branches which will not achieve results in accord with the outcomes of this quick generalized optimization tool.

Figure 26:
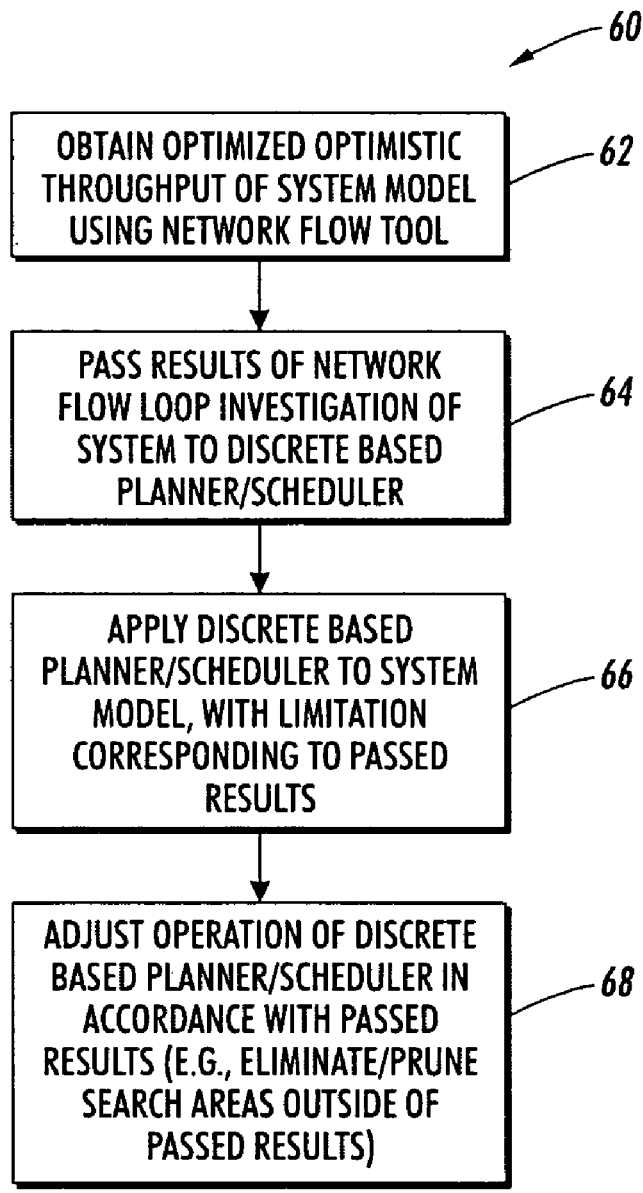
FIG. 26 illustrates use of the network flow tool of the present application in conjunction with a discrete-based planner/scheduler.

With attention to FIG. 26, illustrated is a high-level flow diagram 60 which expands on the concepts described above. In particular, in step 62, the network flow model optimization tool of the present application is operated to obtain optimized, optimistic output of a system. In step 64 the results of step 62 are passed to the discrete based scheduler. Then in step 66, the discrete-based planner/scheduler, such as any of a number of existing discrete schedulers, can be made to function. This discrete-based scheduler may, for example, implement a bound/branch (state/space) search methodology. However, the search is implemented, as shown in step 66, to eliminate or prune any search areas which have potential for results inconsistent with the results passed in step 64. Thus, by implementing the tool of the present application, large areas of the branch search for the discrete-based planner/scheduler may be avoided, resulting in increased speeds at which a real world schedule or plan is developed. The network flow tool of the present application may be operated off-line, and the results incorporated into the discrete planner/scheduler. Alternatively, it can be incorporated as part of the discrete scheduler as a sub-routine called prior to operation of the main discrete processing flow. In either instance, since the tool only takes a few seconds or less to make its evaluations, it does not perceptively delay the discrete scheduler operation, and in fact can greatly decrease the overall operational time required by the discrete scheduler, by decreasing the required search area.

This process could be iterated, while updating either or both the network flow model and/or the discrete planning model at different stages in the search. For example, the optimistic estimate derived by the network flow analysis could be used as a bound during a "branch-and-bound" style combinatorial search. For particular combinations of decisions, the combinatorial search can run the network flow analysis on the resulting system state to derive an optimistic estimate of the possible performance in the resulting state. If the estimate reveals performance that is worse than a performance known to be achievable using a different combination of decisions, the search can avoid further work on the poor choices. As in the previous example, this is also a type of pruning or search-space reduction that can speed up the discrete combinatorial search.

Another implementation in which the network flow tool of the present application is beneficially applied is in the initial design of a manufacturing environment, such as a printing system, machine shop, manufacturing plant, etc. With particular attention to a printing system, currently printing system design is commonly addressed in two phases. The first phase is the development of a reasonable machine "architecture" (meaning interconnection of modules, print engines, inverters, feeders, output trays, etc.). This phase is accomplished more or less manually. The selected architecture will determine the paper path and overall interconnection of components. Then, in the next phase, an existing discrete scheduler is operated on this configuration to evaluate nominal throughput and failure scenarios. This two-stage process can be quite time-consuming, and requires numerous iterations on the part of the designer, and the running of large amounts of different potential cases, each of which might require a significant time investment. For example, once a print system architecture is selected, the designer might be asked to model various failure scenarios, requiring multiple runnings of the scheduler. Then the designer may need to go back and alter the architecture to improve performance during particular failure situations.

Implementation of the network flow tool of the present application enables a designer to rapidly evaluate different scenarios (i.e., within seconds or less), all in the same flow-based modeling domain, and to rule out designs with either inadequate, nominal best-case throughput, or with catastrophic failure scenarios. By adding a large number of possible connections in the machine, the tool can be used to guide the paper path design process itself, jointly with routing optimization techniques, by specifying objective functions which produce optimal paths that are sparse. In that case, unused connections can be discarded.

Figure 27:
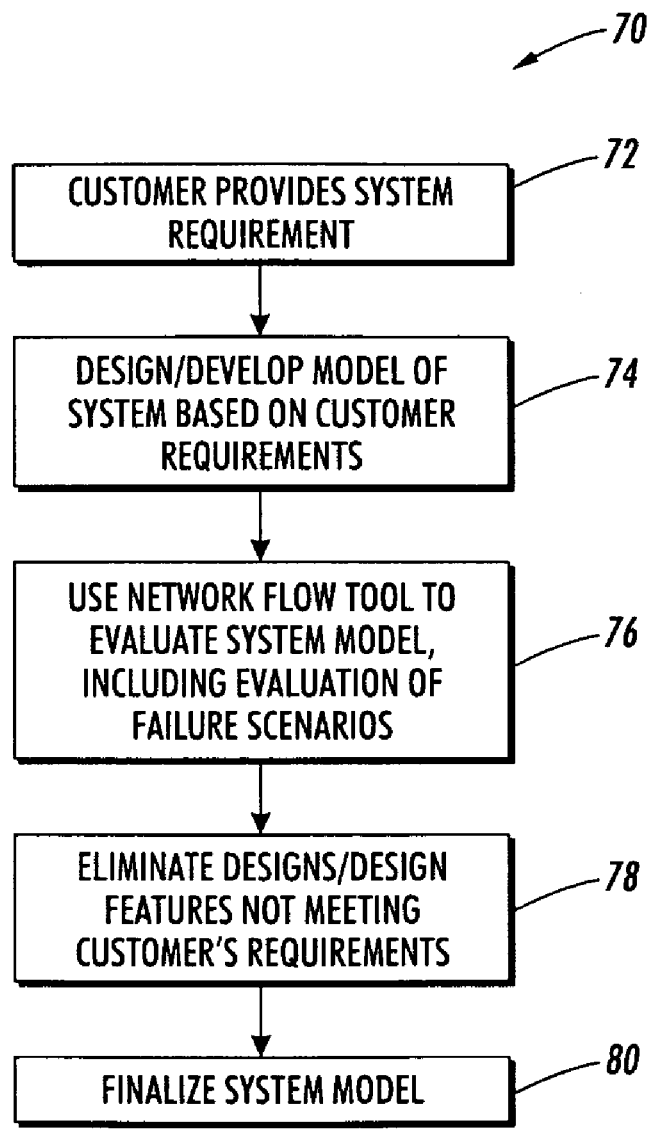
FIG. 27 depicts the network flow tool of the present application implemented as part of a design modeling operation.

FIG. 27 illustrates a top-level flow diagram 70, where the network flow tool may be used to assist in the development of a manufacturing environment for a customer. In step 72, the customer will provide use requirements for the particular manufacturing environment (For example, for a printing system, the customer might provide the typical characteristics and frequencies of job types to be printed). In step 74, the designer develops a model of the manufacturing environment (for example, for a printing system the designer might provide the interconnection of modules of print engines, inverters, feeders, output trays, etc.). The model may be engineered to be as close to the requirements set forth by the customer, or it may be "over designed", where various features of the "over design" will be eliminated during the process. In step 76, the network flow tool is used to evaluate whether the model is (optimistically) capable of meeting the general use requirements set forth by the customer. More particularly, the output of the tool will provide an optimized, optimistic evaluation of the throughput capable by the designed system. In the evaluation stage, the designer may operate the tool not only to see its capabilities when all components of the system are operating appropriately, but may also use the tool to evaluate failure scenarios, such as failure of any one or more of the components of the system. Then in step 78, the designer either eliminates various designs that do not meet the customer's requirements, and/or eliminates components which are not necessary due to the previously "over-engineered" design. As part of the testing, in step 78, the tool may be used in conjunction with other discrete planner/schedulers to compute and evaluate realistic schedules. Thereafter in step 80, the designer finalizes the manufacturing environment model appropriate for the particular customer. The above scenario can be implemented in an on-line or off-line configuration, and the steps of the process described in FIG. 27 may, for example, be undertaken by a designer on a computer assisted drafting (CAD) tool, or in conjunction with another appropriate design tool. It will be apparent to one skilled in the art that various stages of the process might be automated.

Thus, from the foregoing the above-described tool is used to quickly construct a network flow model that captures the steady-state behavior of a system. It is applicable for large complex systems as it permits for the evaluation of scenarios very quickly. This is true since the tool is based on very efficient optimization solvers that do not have a property of increasing in size exponentially as the problem increases, thus this tool scales-up efficiently. The models for this network flow tool will grow as the problem grows, in a polynomial fashion, rather than exponentially or combinatorially. This allows a user to explore scenarios very quickly, though generally, and permits a user to rapidly investigate alternative scenarios. When used in combination with a branch/bound planner type system, it is used as a heuristic device to enhance the planner. Particularly, as mentioned above, it can eliminate searching of branches which are outside a desirable outcome.

A reason the present design is "friendly" (i.e., it does not grow exponentially with an increase in the problem size) is because the links do not grow exponentially. Rather, the system grows linearly, in accordance with the number of components added to the system. So for example, if the number of components are doubled, then the number of links are doubled. On the other hand, in traditional discrete scheduling methodology, branching is a technique which is often used. When branching, even if it is necessary to make two decisions at a new branch, then the problem increases by a factor of two with each new branch.

This system also permits for the use of sensitivity/reliability analysis (i.e., duality, LaGrange multipliers, etc.), and multi-objective optimal design, since it is possible to manipulate the formulation by adding different cost functions or constraints to capture different and unique desirable outcomes. The method can also be used in systems simultaneously processing multiple jobs, each with its own sequence of operations and machine processing times, to evaluate tradeoffs in different job mixes, with respect to any operational parameter, such as cost, performance, reliability, etc.

Thus, the above described concepts present a constrained multi-commodity network flow (CMNF) model tool used for complex manufacturing systems. This tool can capture the notion of steady-state throughput in a very fast manner, and provides an upper bound on the best achievable throughput. The system will also scale well with machine size, as it grows in a polynomial fashion, rather than exponentially. The system also enables the application of efficient, convex optimization which is implemented using known numerical solvers, which for this type of problem are very fast and efficient. The applicants have undertaken experimentation and have found that for a printer with four print engines, a network flow model of the present type includes 60 nodes, 120 links (with five flows on each link), resulting in 600 variables. This system took less than two seconds to compute a throughput estimate using the Matlab software. A reason the present network flow tool is able to operate at such fast speeds in this embodiment is that it is not required to return detailed plans. Rather, it is being used to provide only the information as to the parameter or parameters of interest, and not, for example, detailed sheet printing plans.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for obtaining an optimistic estimate of an operational parameter for a realistic system model under investigation, the realistic system model including components and paths arranged to process continuous or discrete commodities, the method comprising:
   generating an abstracted network flow model of the realistic system model under investigation, by use of a network flow tool;
   applying constraints to the abstracted network flow model, by use of the network flow tool;
   forming a plurality of steady state network flows, taking into consideration the applied constraints, by use of the network flow tool;
   cascading the network flows into an aggregate network flow by the imposed constraints which captures a transformation of the commodities from a first state to a final output state, by use of the network flow tool;
   solving a network flow problem using a convex optimization implemented on a general-purpose or custom solver, by use of the network flow tool;
   returning, for the realistic system model under investigation, an optimistic estimate of an operational parameter, by use of the network flow tool, wherein as additional components are added to the realistic system model, a problem to be solved grows linearly with the number of components added, and is solved using polynomial time algorithms;
   wherein the step of generating the abstracted network flow model includes providing for entry and re-entry paths to the same component whereby flows within the network flow model cycle through the same component multiple times, wherein the component performs a function in a printing system including a print engine that prints paper, a feeder that feeds paper into the print engine for printing, an inverter that inverts the paper to be fed into the print engine and a highway connection connecting the paper among individual components of the system;
   wherein the solving includes approximating an average process flow by removing a constraint that the components are discrete elements, optimizing all the flows at the same time, and formulating each process flow and component as a steady-state element from the beginning of the processing steps for all processing steps;
   wherein at least some of the components are modeled as physically distributed from each other; and
   wherein the steps of generating, applying, forming, cascading, solving, and returning are executed by at least one processor of a computer.

2. The method of claim 1, wherein the returned optimistic estimate for the operational parameter is one of the optimistic estimate of a maximum throughput of the realistic system model.

3. The method of claim 1, wherein the returned optimistic estimate for the operational parameter is one of the optimistic estimate of at least one of a maximum reliability, cost usage, or component usage of the realistic system model.

4. The method of claim 1, the step of forming the plurality of network flows resulting in the generation of modeled physical routes through the modeled physically distributed components.

5. The method of claim 1, further comprising:
determining job scheduling in scenarios with multiple job types with potentially different sequences of operations, and potentially different processing times on different components at different stages, and
evaluating tradeoffs between component allocations, job mixes, operating costs and throughput.

6. The method of claim 1, further including,
passing the optimistic estimate of the system model to a discrete planner/scheduler.

7. The method of claim 6, further comprising:
determining a decreased search area required to be explored by the discrete planner/scheduler.

8. The method of claim 1, wherein the returned optimistic estimate is incorporated in an offline process to design a customized system, or an online process for adapting the system to various scenarios.

9. The method of claim 1, further comprising:
determining sheet route planning with the operational parameter optimistic estimate.

10. The method of claim 1, further comprising: determining job scheduling or printshop scheduling.

11. The method of claim 1, wherein the applied constraints include forcing at least one component to a non-operational state or to zero, resulting in no-flow being permitted to enter that at least one component.

12. The method according to claim 1, wherein the step of applying the constraints includes applying constraints of more than a single variable of the network flow model under investigation.

13. The method of claim 1, wherein removing the constraint that each component is a discrete element comprises:
eliminating all transients, including ramp-up transients and ramp-down transients while the system model is being filled-up and when the system model is ending respectively, in order to capture steady-state behavior.

14. The method of claim 1, wherein each of the flows is moving through the highway at the same time.

15. The method of claim 1, wherein the solving considers potential future flows.

16. The method of claim 1, further comprising:
evaluating a failure of at least one of the components of the system.

17. A method for abstracting a realistic system model of a system having a plurality of components and transmission paths selectively connecting the components, at least some of the components being of a similar type arranged to process discrete commodities to a network flow model, to obtain an optimistic estimate of an operational parameter of the realistic system model comprising:
generating a network flow model including nodes and links, the nodes acting as connection points between links, the links representing the components and transmission paths of the realistic system model, and optionally provided artificial nodes used to represent components of a similar type, by use of a network flow tool;
imposing equality constraints on each node linked to an artificial node, where the equality constraints are between an input flow and an output flow;
relaxing a constraint that discrete commodities are discrete objects, to permit movement of the discrete objects as a continuous flow, by use of the network flow tool;
applying constraints to the formed network flow model, the constraints including a requirement that an amount of a commodity which flows into certain components at one stage of the process will flow out of those same components at a subsequent stage of the process and a requirement the flow on any path does not exceed a predetermined maximum for the path, by use of the network flow tool;
performing a plurality of steady state network flows, within the generated network flow model of the system under investigation, where some of the plurality of individual network flow models include flows to the optionally provided artificial nodes which sum the flows of the similar types of components, by use of the network flow tool;
cascading the individual steady state network flows into an aggregate network flow which captures the inter-relationship between the individual steady state network flows and a transformation of the commodities from a first state to a final output state, by use of the network flow tool;
solving a network flow problem using convex optimization implemented on a general purpose or custom solver, by use of the network flow tool that is executed by a processor of a computer; and
returning an optimized optimistic estimate of an operational parameter of the realistic system model under investigation, by use of the network flow tool, wherein as additional components are added to the realistic system model, a problem to be solved grows in a polynomial manner, and solved using polynomial time algorithms;
wherein the step of generating the abstracted network flow model includes providing for entry and re-entry paths to the same component wherein flows within the network flow model cycle through the same component multiple times, wherein the component performs a function in a printing system including a print engine that prints paper, a feeder that feeds paper into the print engine for printing, an inverter that inverts the paper to be fed into the print engine and a highway connection connecting the paper among components of the system;
wherein the solving includes approximating an average process flow by formulating all process flows and components as steady-state elements throughout all processing steps and removing a constraint that the components are discrete elements;
wherein each of the links have a known capacity relating to the component and transmission path, including variables of the component and transmission path, with which it is associated and each of the links may include variables of more than a single component or transmission path;
wherein the method returns the optimistic estimate of the operational parameters within the constraints of the added variables;
wherein the steps of generating, applying, performing, cascading, solving, and returning are executed by at least one processor of a computer.

18. The method of claim 17, wherein the optimized estimate of the operational parameter is the optimized estimate of a maximum throughput of the realistic system model.

19. The method of claim 17, wherein the optimized estimate of the operational parameter is the optimized estimate of at least one of a maximum reliability, cost usage, and component usage of the realistic system model.

20. The method of claim 17, further comprising: determining job scheduling in scenarios with multiple job types with different sequences of operations, and potentially different processing times on different components at different stages, and wherein the method evaluates tradeoffs between component allocations, job mixes, operating costs and throughput.

* * * * *